US012704931B1

(12) United States Patent
Alameh et al.

(10) Patent No.: US 12,704,931 B1
(45) Date of Patent: Aug. 11, 2026

(54) SYSTEM AND METHOD FOR A THIN CAPACITIVE SPLIT KEYBOARD STACK INCLUDING A LIGHT-EMITTING DIODE (LED) LAYER AND LIGHT GUIDE FOR AN INFORMATION HANDLING SYSTEM

(71) Applicant: Dell Products LP, Round Rock, TX (US)

(72) Inventors: Rachid M. Alameh, Crystal Lake, IL (US); Jason Scott Morrison, Chadron, NE (US); Brandon Joel Brocklesby, Pflugerville, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/287,123

(22) Filed: Jul. 31, 2025

(51) Int. Cl.
*G06F 3/044* (2006.01)
*G06F 3/01* (2006.01)
*G06F 3/02* (2006.01)
*G06F 3/023* (2006.01)
*G06F 3/04883* (2022.01)

(52) U.S. Cl.
CPC .............. *G06F 3/044* (2013.01); *G06F 3/017* (2013.01); *G06F 3/0202* (2013.01); *G06F 3/021* (2013.01); *G06F 3/04883* (2013.01); *G06F 3/0238* (2013.01); *G06F 2203/04101* (2013.01); *G06F 2203/04107* (2013.01); *G06F 2203/04108* (2013.01)

(58) Field of Classification Search
CPC ........ G06F 3/044; G06F 3/017; G06F 3/0202; G06F 3/021; G06F 3/04883; G06F 3/0238; G06F 2203/04101; G06F 2203/04107; G06F 2203/04108
See application file for complete search history.

(56) References Cited

U.S. PATENT DOCUMENTS 6,610,944 B2 * 8/2003 Lee ........................ G06F 1/1662
400/490
6,644,874 B2 * 11/2003 Tsai ...................... G06F 1/1616
400/490
(Continued)

FOREIGN PATENT DOCUMENTS

WO 2016/111876 A1 7/2016

*Primary Examiner* — Michael J Jansen, II
(74) *Attorney, Agent, or Firm* — Prol Intellectual Property Law, PLLC; H. Kenneth Prol

(57) ABSTRACT

An information handling system comprising a hardware processor, a data storage device, and a power management unit includes a split keyboard stack structure having a removable tactile input layer and a keyboard sensing hardware structure formed on a multi-layer flexible printed circuit board or on a thin two-sided substrate membrane below a sealed input surface that forms a top surface of a keyboard chassis and onto which a removable tactile input layer is installed. The keyboard sensing hardware structure detects capacitive changes to capacitive fields above the sealed input surface with capacitive sensor pads of a capacitive pads layer and includes a plurality of shielding pads, a light-emitting diode (LED) layer comprising a plurality of LEDs formed coplanar with the capacitive sensor pads, wherein the sealed input surface has a light guide layer integrated to transmit light emitted from the plurality of LEDs up through the removable tactile input layer.

20 Claims, 13 Drawing Sheets

(56) References Cited

U.S. PATENT DOCUMENTS

| | | | | |
|---|---|---|---|---|
| 6,705,782 | B2 * | 3/2004 | Cheng | G06F 1/1616 400/472 |
| 6,803,865 | B2 * | 10/2004 | DeLuga | H01H 13/702 345/169 |
| 6,903,662 | B2 * | 6/2005 | Rix | G06F 3/0238 341/20 |
| 6,971,807 | B2 * | 12/2005 | Tsai | H01H 3/125 361/679.13 |
| 7,750,261 | B2 * | 7/2010 | Tsai | G06F 1/1662 200/302.2 |
| 7,847,204 | B2 | 12/2010 | Tsai | |
| 8,451,104 | B2 * | 5/2013 | Krahenbuhl | G06F 3/04886 345/174 |
| 8,553,907 | B2 * | 10/2013 | Thomason | G06F 1/1688 381/103 |
| 9,024,884 | B2 * | 5/2015 | Lengeling | G06F 3/0393 345/173 |
| 9,024,908 | B2 * | 5/2015 | Sinclair | G06F 3/016 345/173 |
| 9,335,844 | B2 * | 5/2016 | Arthur | G06F 3/04886 |
| 10,871,828 | B2 * | 12/2020 | Ligtenberg | G06F 3/04144 |
| 10,921,912 | B2 * | 2/2021 | Kumar | G06F 3/039 |
| 11,139,129 | B2 | 10/2021 | Wang et al. | |
| 11,256,362 | B2 * | 2/2022 | Jain | G06F 3/0202 |
| 11,662,843 | B2 * | 5/2023 | Kumar | G06F 3/044 345/173 |
| 11,817,275 | B2 | 11/2023 | Wang et al. | |
| 2003/0034904 | A1 * | 2/2003 | DeLuga | G06F 1/1616 200/302.1 |
| 2003/0057076 | A1 * | 3/2003 | Lee | G06F 1/1656 200/302.1 |
| 2003/0123916 | A1 * | 7/2003 | Cheng | G06F 1/1616 400/472 |
| 2003/0129010 | A1 * | 7/2003 | Tsai | G06F 1/1662 400/472 |
| 2004/0056781 | A1 * | 3/2004 | Rix | G06F 3/0202 341/20 |
| 2005/0013645 | A1 * | 1/2005 | Tsai | G06F 1/1662 400/472 |
| 2006/0022956 | A1 * | 2/2006 | Lengeling | G06F 3/04842 345/173 |
| 2006/0256090 | A1 * | 11/2006 | Huppi | A63F 13/92 345/173 |
| 2007/0199804 | A1 | 8/2007 | Joseph et al. | |
| 2009/0057113 | A1 * | 3/2009 | Tsai | G06F 3/0202 200/302.1 |
| 2009/0073128 | A1 | 3/2009 | Marsden | |
| 2010/0328251 | A1 * | 12/2010 | Sinclair | G06F 3/016 345/173 |
| 2011/0091051 | A1 * | 4/2011 | Thomason | G06F 1/1616 381/103 |
| 2011/0102326 | A1 | 5/2011 | Casparian et al. | |
| 2011/0290628 | A1 | 12/2011 | Tsai | |
| 2011/0291820 | A1 * | 12/2011 | Krahenbuhl | G06F 3/04886 345/174 |
| 2011/0297523 | A1 | 12/2011 | Tsai | |
| 2012/0120564 | A1 * | 5/2012 | Lu | G06F 1/1662 361/679.01 |
| 2012/0228111 | A1 | 9/2012 | Peterson et al. | |
| 2013/0079139 | A1 * | 3/2013 | Gray | G06F 3/04886 345/173 |
| 2013/0118878 | A1 * | 5/2013 | Purcocks | H01H 9/04 29/622 |
| 2013/0154938 | A1 * | 6/2013 | Arthur | G06F 3/0443 345/168 |
| 2013/0313094 | A1 | 11/2013 | Shen et al. | |
| 2014/0062684 | A1 | 3/2014 | Casparian et al. | |
| 2014/0069792 | A1 | 3/2014 | Bates et al. | |
| 2014/0097857 | A1 | 4/2014 | Hu | |
| 2014/0224633 | A1 | 8/2014 | Peterson et al. | |
| 2016/0195955 | A1 | 7/2016 | Picciotto et al. | |
| 2018/0217668 | A1 | 8/2018 | Ligtenberg et al. | |
| 2018/0217669 | A1 | 8/2018 | Ligtenberg et al. | |
| 2018/0218859 | A1 * | 8/2018 | Ligtenberg | G06F 1/165 |
| 2019/0042040 | A1 * | 2/2019 | Kumar | G06F 3/0412 |
| 2020/0278747 | A1 | 9/2020 | Ligtenberg et al. | |
| 2020/0401265 | A1 * | 12/2020 | Jain | G06F 3/0418 |
| 2021/0165502 | A1 * | 6/2021 | Kumar | G06F 3/039 |
| 2021/0165513 | A1 | 6/2021 | Liu et al. | |
| 2021/0407748 | A1 | 12/2021 | Wang et al. | |
| 2022/0326777 | A1 | 10/2022 | Ligtenberg et al. | |
| 2023/0027386 | A1 * | 1/2023 | Ghosh | G06F 1/1656 |
| 2023/0333658 | A1 | 10/2023 | Ligtenberg et al. | |
| 2024/0047156 | A1 | 2/2024 | Wang et al. | |
| 2025/0044874 | A1 | 2/2025 | Ligtenberg et al. | |

* cited by examiner

SYSTEM AND METHOD FOR A THIN CAPACITIVE SPLIT KEYBOARD STACK INCLUDING A LIGHT-EMITTING DIODE (LED) LAYER AND LIGHT GUIDE FOR AN INFORMATION HANDLING SYSTEM

FIELD OF THE DISCLOSURE

The present disclosure generally relates to a system and method for detecting human input via contactless capacitive sensing at a keyboard or other input/output interface device. The present disclosure more specifically relates systems and methods for a split keyboard structure that has contactless capacitive sensing for keyboard functions and for touch and touchless gesturing user inputs at an information handling system that includes an LED layer and light guide.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as fand teleconferencing, word processing, sales systems, business software, gaming applications, and the like. In some embodiments, a user interface via a keyboard or other input/output (I/O) devices may be used with an information handling system for access and input commands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
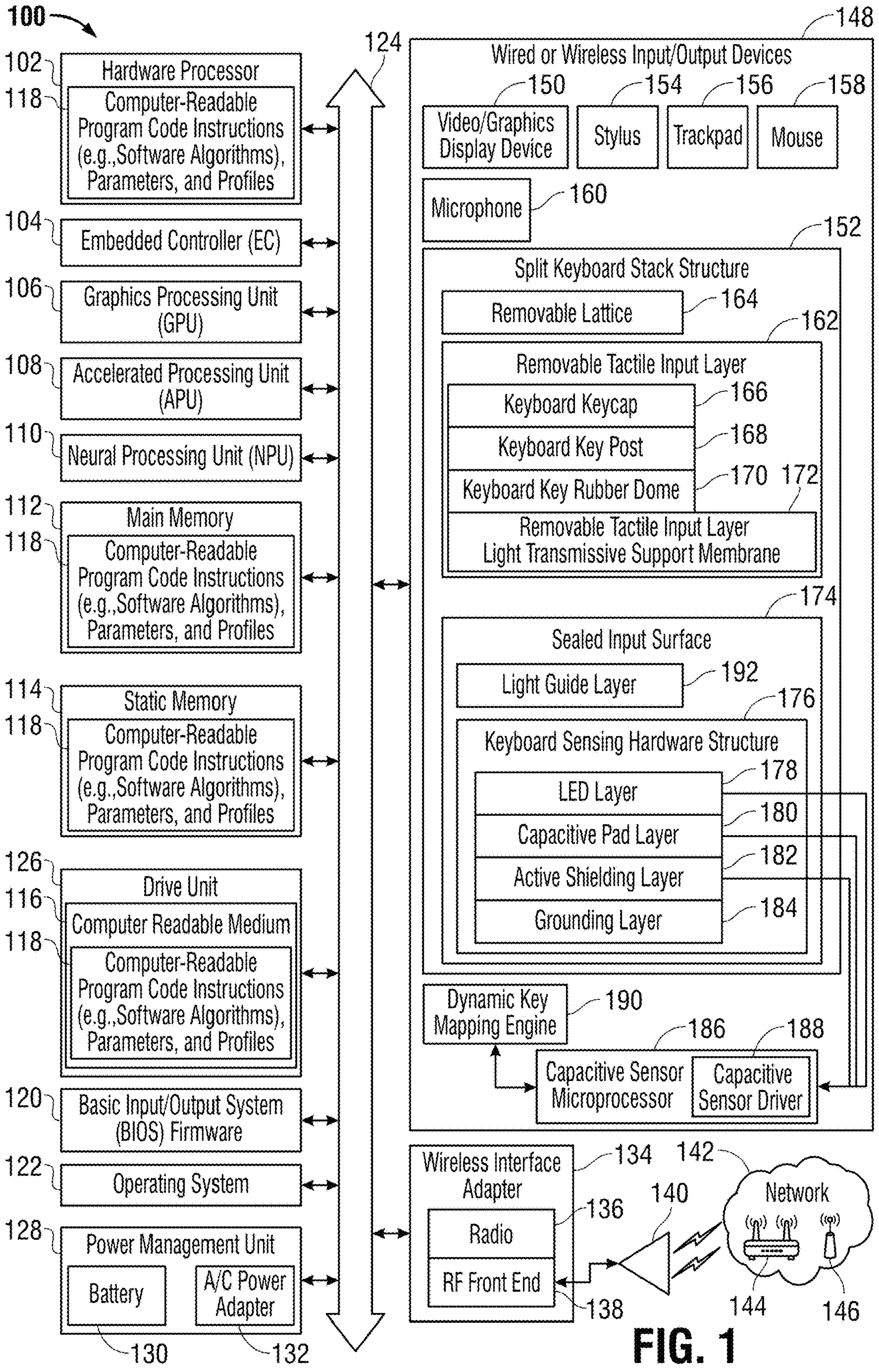
FIG. 1 is a block diagram illustrating an information handling system that includes a split keyboard stack structure having a removeable tactile input layer and a separate sealed input surface to receive touch and gesture input from a user contactlessly at capacitive sensor pads and including lighting in a keyboard sensing hardware structure formed under the sealed input surface according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may include one or more input/output (I/O) devices for receiving user input and which may include a keyboard, a touchpad, a gesture sensing device such as a camera or infrared camera among other I/O devices. Laptop-type information handling systems include a built-in keyboard. These built-in keyboards are integrated into a base portion of the laptop-type information handling system. During operation of the information handling system, the user may accidentally spill liquids onto the keyboard which may damage the internal electrical connections within the keyboard. As liquids may damage the electrical components of the keyboard, the introduction of liquid onto the keyboard would require subsequent repair of the keyboard. Such a repair would require opening of the housing of the base portion of the information handling system to replace the damaged keyboard. Additionally, the introduction of liquid onto the keyboard portion of the base housing may also create damages to those other components within the base portion of the laptop-type information handling system. This is because current keyboards are not sufficiently designed to include a liquid barrier to the underlying keyboard components or these other computer hardware components within the base housing of the laptop-type information handling system.

It is also true that current keyboards include mechanical elements and electrical elements associated with each of the keys. These mechanical and electrical elements may include dome switches, scissor mechanisms, flexible printed circuit board traces, contact pads, contact switches, and the like. Those mechanical and electrical features may degrade over time with repeated physical contact. This may result in individual keys or a series of keys being inoperable. Costs associated with these mechanical elements and the electrical elements associated with those mechanical elements may be expensive as well or may simply cause an entire keyboard to need to be replaced. The mechanical and electrical failure of these mechanical and electrical elements may, again, result in the need to replace the whole keyboard or the entire laptop information handling system increasing costs to consumers of such laptop-type information handling systems as well as generating waste and unnecessary costs.

The present specification describes a split keyboard stack structure that may be part of a laptop-type information handling system that has the split keyboard structure installed in a base or keyboard chassis. The split keyboard structure may include a purely mechanical removable tactile input layer installed on a sealed input surface of the base/keyboard chassis that a user may use to provide input to the laptop-type information handling system and a keyboard sensing hardware structure formed under the sealed input surface that detects user input in embodiments herein. The removable tactile input layer may include only mechanical parts that provide tactile feedback to the user providing input at a keyboard. The sealed input surface may include the keyboard sensing hardware structure formed thereunder having embedded sensing technologies that detect keystrokes made on the removable tactile input layer. These embedded sensing technologies may include, in embodiments herein, a plurality of capacitive sensor pads in a capacitive pads layer in the keyboard sensing structure formed under a sealed input surface. Further, the keyboard sensing hardware structure formed under the sealed input surface may include a shielding layer comprising a plurality of shielding pads formed vertically below the plurality of capacitive sensor pads as well as a grounding layer.

In an embodiment, the sealed input surface may include a light guide placed above the keyboard sensing hardware structure to allow light from one or more LEDs formed in the keyboard sensing hardware structure to transmit through the sealed input surface to any removable tactile input layer installed above. The sealed input surface with the light guide may seal the layers, such as the capacitive sensor pads and electronics, of the keyboard sensing hardware structure as well as other hardware component devices within the base chassis of the information handling system. Thus, in the embodiments herein, the light guide may form or be part of the sealed input surface that nonetheless prevents contamination or liquid damage to those layers, such as the capacitive sensor pads and electronics, of the keyboard sensing hardware structure as well as other hardware component devices within the base chassis of the laptop-type information handling system.

The keyboard sensing hardware structure including a capacitive pads layer, an active shielding layer and a grounding layer in embodiments herein may be formed on an FPC layer or a thin two-sided substrate membrane to receive keyboard, touch, and gesture input from a user contactlessly at capacitive sensor pads and further include lighting formed under the sealed input surface in various embodiments herein. The FPC layer or a thin two-sided substrate membrane, such as a polyethylene terephthalate (PET) or other thermoplastic polymer membrane, may be used to form capacitive sensor pads such as deposited carbon, conductive traces, and active shielding pads in a very thin and compact form for the keyboard sensing hardware structure to allow the capacitive sensor pads to be formed very close to the sealed input surface to receive keyboard, touch, and gesture input from a user input at or above the removable tactile input layer installed above the sealed input surface in embodiments herein. Thus, in embodiments herein, a plurality of light-emitting diodes (LEDs) may also be formed on or in the FPC layer or the thin two-sided substrate membrane as well. These LEDs are also placed below the light guide formed into the sealed input surface such that light emitted from the LEDs may be diffused upward to light the purely mechanical removable tactile input layer installed above the sealed input surface from below.

In an embodiment, the keyboard sensing structure with capacitive pads layer, active shielding layer and LEDs may be formed onto a multi-layer flexible printed circuit (FPC) board. In an embodiment, the LEDs may be formed onto a top surface of a first layer of the multi-layer FPC and may be coplanar with the plurality of capacitive sensor pads. The multi-layer flexible printed circuit (FPC) board having the keyboard sensing structure and LEDs may be adhered with a thin adhesive layer to the under surface of the sealed input surface of the keyboard chassis in embodiments herein. In another embodiment, the keyboard sensing structure with capacitive pads layer, active shielding layer and LEDs may be formed into a thin two-sided substrate membrane, such as a PET or other thermoplastic polymer membrane. In this embodiment, the keyboard sensing structure layers and LEDs may be formed into a very thin layer and under the sealed input surface for a very thin keyboards sensing structure and enabling the capacitive sensor pads and LED to be formed very close to the underside of the sealed input surface for better proximity to the removable tactile input layers installed above the sealed input surface.

In an embodiment, a hardware processing device of the information handling system such as a capacitive sensor microprocessor may execute machine readable program code instructions that detect user gestures and touch at a keyboard of the information handling system. The information handling system may comprise a hardware processor, a data storage device, and a power management unit (PMU) to provide power to the hardware processor and data storage device with the data storage device storing any machine readable program code instructions described herein.

In an embodiment, each of the plurality of capacitive sensor pads may be operatively coupled to a capacitive sensor microprocessor executing machine readable program code of a capacitive sensor driver that can determine when various capacitive thresholds are reached that may indicate a press of a key on the removable tactile input layer, hovering of a user's fingers over any given key of the removable tactile input layer, and/or gestures above the surface of the removable tactile input layer.

Because the removable tactile input layer is separate from the sealed input surface, the removable tactile input layer may be secured to and removable from the sealed interface surface of the base or keyboard chassis of an information handling system via a latching mechanism, magnetic interface, interference fit structures, or an adhesive layer in various embodiments. In embodiments herein, the sealed input surface of a split keyboard stack structure is formed or installed within a recessed housing well in a c-cover or top cover of a base chassis for a laptop-type information handling system. The recessed housing well with the sealed input surface is formed to fit and receive plural swappable removable tactile input layers in embodiments herein. For example, interference fit edges, lips, wedge structures or the like may be formed around a rim or perimeter of the recessed housing well with reciprocal interference fit structures formed on a support frame of the removable tactile input layers in an embodiment. In other embodiments, reciprocal latching structures, physical engagement structures, or magnetic structures may be formed around a rim or perimeter of the recessed housing well or into the sealed input surface with reciprocal interference fit structures formed on a support frame around edges of or on a bottom surface of the removable tactile input layers in other embodiments. Thus, the removable tactile input layer may be selectively removed and replace that removable tactile input layer with a new or different removable tactile input layer. Because the removable tactile input layer may be swapped out for a different removable tactile input layer such as a removable tactile input layer that includes a different key layout or includes different input/output (I/O) devices, the information handling system may also include a capacitive sensor microcontroller that executes machine readable program code instructions of a dynamic key mapping engine configured to dynamically assign keyboard functions or other I/O functions to specific capacitive sensor pad locations across the capacitive pads layer based on user-defined layouts. This results in the removable tactile input layer being user-replaceable and modular with allows for easy, cost-effective, repairs or replacements without having to open up a housing of the base portion of the laptop-type information handling systems.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Machine readable code instructions stored in main memory 112 (e.g., RAM) may be accessible by hardware processing resources using that main memory 112. Machine readable program code instructions stored in static memory 114, main memory 112, or drive unit 126 may be involved in invoking such machine readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a split keyboard stack structure 152, a video/graphics display device 150, a microphone 160, or any combination thereof. Further, various wired or wireless input and output (I/O) devices 148, such as a microphone 160, speaker 168, a trackpad 156, a stylus 154, a split keyboard stack structure 152, a video/graphics display device 150, mouse 158, or any combination thereof may be integrated into the chassis of the information handling system 100 in other embodiments. The split keyboard stack structure 152 may include the split-keyboard stack structure of various embodiments in the present disclosure. Portions of an information handling system 100 may themselves be considered information handling systems 100.

Information handling system 100 may include devices or modules that embody one or more of the devices or execute instructions for one or more systems and modules. The information handling system 100 may execute machine readable program code instructions (e.g., software algorithms) parameters, and profiles 118 that may operate on servers or systems, remote data centers, or on-box in individual client information handling systems according to various embodiments herein. In some embodiments, it is understood that any or all portions of machine readable program code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute machine readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with non-transitory machine readable medium 116 storing machine readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a split keyboard stack structure 152, a mouse 158, video/graphics display device 150, stylus 154, trackpad 156, microphone 160, or speaker among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a split keyboard stack structure 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes machine readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing machine readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a machine readable medium that includes machine readable program code instructions, parameters, and profiles 118 or receives and executes machine readable program code instructions, parameters, and profiles 118 responsive to a propagated signal, so that a hardware device connected to a network 142 may communicate voice, video, or data over the network 142. Further, the machine readable program code instructions, parameters, and profiles 118 may be transmitted or received over the network 142 via the network interface device or wireless interface adapter 134.

The information handling system 100 may include a set of machine readable program code instructions, parameters, and profiles 118 that may be executed to cause the computer system to perform any one or more of the methods or computer-based functions disclosed herein. For example, machine readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application machine readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a non-transitory machine readable medium 116 for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain non-transitory machine readable medium (not shown), such as RAM in an example embodiment. An example of main memory 112 includes random access memory (RAM) such as static RAM (SRAM), dynamic RAM (DRAM), non-volatile RAM (NV- RAM), or the like, read only memory (ROM), another type of memory, or a combination thereof. Static memory 114 may contain non-transitory machine readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the machine readable medium is shown to be a single medium, the term "machine readable medium" includes a single medium or multiple media, such as a centralized or distributed database, and/or associated caches and servers that store one or more sets of machine-readable code instructions. The term "machine readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, a video/graphic display device 150, or other wired or wireless I/O devices 148 such as the mouse 158, the stylus 154, the split keyboard stack structure 152, microphone 160, and the trackpad 156 and other components that may require power when a power button has been actuated by a user. In an embodiment, the PMU 128 may monitor power levels and power may be electrically coupled to the information handling system 100 via various ports in embodiments herein to provide this power. The PMU 128 may be coupled to the bus 124 to provide or receive data or machine-readable code instructions. The PMU 128 may regulate power from a power source such as the battery 130, or AC power adapter 132 such as from one or more ports. In an embodiment, the battery 130 may be charged via the AC power adapter 132 and provide power to the components of the information handling system 100 when AC power from the AC power adapter 132 is removed.

In a particular non-limiting, exemplary embodiment, the machine readable medium can include a solid-state memory such as a memory card or other package that houses one or more non-volatile read-only memories. Further, the machine readable medium can be a random-access memory or other volatile re-writable memory. Additionally, the machine readable medium can include a magneto-optical or optical medium, such as a disk or tapes or other storage device to store information received via carrier wave signals such as a signal communicated over a transmission medium. Furthermore, a machine readable medium 116 can store information received from distributed network resources such as from a cloud-based environment. A digital file attachment to an e-mail or other self-contained information archive or set of archives may be considered a distribution medium that is received and stored into a tangible storage machine readable medium. Accordingly, the disclosure is considered to include any one or more of a machine readable medium or a distribution medium and other equivalents and successor media, in which data or machine-readable code instructions may be stored or transmitted.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a split keyboard stack structure 152 used by a user to provide input to the information handling system 100. In the context of the present specification, the information handling system 100 may be a laptop-type information handling system 100 that includes a base portion and a lid portion. A housing of the lid portion, in an embodiment, may house the video/graphics display device 150 described herein. The base portion may be where the split keyboard stack structure 152 is formed giving the user the ability to provide input to the information handling system 100.

The split keyboard stack structure 152 may have a split keyboard structure which includes a removeable tactile input layer 162 with a keyboard or other I/O input device operatively coupled or installed onto a sealed input surface 174. The removeable tactile input layer 162 may be the layer that a user interacts with to provide input to the information handling system 100. This removeable tactile input layer 162 may include only mechanical elements such as mechanical keyboard keys that each includes a keyboard keycap 166, a keyboard key post 168, and a keyboard key rubber dome 170 that provides tactile response to the user when the mechanical keyboard keys are pressed or other I/O interface structures such as touch areas. The removable tactile input layer 162 may not have any associated electronics. Instead, a user's finger or movement of mechanical keyboard keys may affect capacitance detected in the keyboard sensing hardware structure 176 formed under a sealed input surface 174 of the split keyboard stack structure 152 such as with a capacitive pads layer 180 in embodiments herein. In a specific example, the removeable tactile input layer 162 may include one or more keyboard keys that includes a keyboard keycap 166 operatively coupled to a keyboard key rubber dome 170 or popple via a keyboard key post 168 forming each of the mechanical keyboard keys among the plurality of mechanical keyboard keys 195 formed in a tray, grid, or other support structure and formed of a suitable material. Plural removable tactile input layers 162 with various keyboard structure layouts or other I/O input device structures may be installed and operated with the keyboard sensing hardware structure 176 formed under the sealed input surface 174 of the chassis of information handling system 100 in embodiments herein. In this example embodiment, instead of the keyboard key rubber dome 170 having a switch or activating a switch on a printed circuit board (PCB), the keyboard keycap 166 and keyboard key rubber dome 199 may be used to help provide location of a keyboard key in the removeable tactile input layer 162 and over the keyboard sensing hardware structure 176 formed under the sealed input surface 174 as well as provide tactile feedback to the user. No physical engagement with keypress sensing electronics is required in the removeable tactile input layer 162 and, accordingly, the removable tactile input layer 162 is easily removable and replaceable for any of a plurality of removable tactile input layers 162 that can be replaced and used with the keyboard sensing hardware structure 176 formed under the sealed input surface 174.

In an example embodiment, the removeable tactile input layer 162 may also include scissor or butterfly arms that also provide tactile feedback to the user while facilitating the recoil of the keycap upwards for tactile feedback of a keypress to a user. However, the removable tactile input layer 162 does not include any electrical elements that are used to receive electrical signals as the user presses the keyboard keys. As such, in the embodiments herein, the removable tactile input layer 162 does not include a PCB layer, a flexible PCB layer, or other electrical components that other keyboards may use to detect the press of a keyboard key by the user. Instead, in the embodiments herein, the split-keyboard structure of the split keyboard stack structure 152 includes the keyboard sensing hardware structure 176 formed under the sealed input surface 174 where those keypress strokes of the keyboard keys on the removable tactile input layer 162 are capacitively detected, thus contactlessly sensed.

In an embodiment, the removeable tactile input layer 162 may further include a removable tactile input layer light transmissive membrane 172. The removable tactile input layer light transmissive membrane 172 may be any surface that allows for light to pass up and into the removeable tactile input layer 162 such as through particular light guide material, light transmissive opening or formed of a material that is light transmissive or light transparent in various embodiments. In an example embodiment, the removable tactile input layer light transmissive membrane 172 may be made of a plastic that is transparent or translucent. In an embodiment, the removable tactile input layer light transmissive membrane 172 may be made of a translucent material that scatters or diffuses a light emitted from one or more light-emitting diodes (LEDs) of a LED layer 178 formed below the sealed input surface 174. This may create a lighted backlight for the split keyboard stack structure 152 or other lighting indicator functions as described in embodiments herein.

In an embodiment, the removeable tactile input layer 162 may further include a removable lattice 164 or a keyboard. The removable lattice 164 may be a lattice structure that is formed around each of the keyboard keycaps 166 of each keyboard keys on the split keyboard stack structure 152. In an embodiment, the removable lattice 164 may be made of a rigid material such as a plastic. The removable lattice 164 may be used to secure the removeable tactile input layer 162 into a recessed housing well formed into a c-cover of the base chassis of the laptop-type information handling system such that the removeable tactile input layer 162 may be removably installed within the recessed housing well or removed therefrom. It is appreciated that the removable lattice 164 may include any latching mechanism, interference fit structures, magnetic structures, or the like to secure the removeable tactile input layer 162 into this recessed housing well housing well. In other embodiments, the recessed housing well may include an outer rim or may have a sealed input surface therein with latching mechanism, interference fit structures, magnetic structures, or the like to secure to reciprocal structures on the frame or housing of the removable tactile input layer 162.

The keyboard sensing hardware structure 176 formed under the sealed input surface 164 may include a plurality of layers with an LED layer to illuminate and capacitive sensor pads used to detect those keypress keystrokes, via capacitive sensing, during actuation of keyboard keys on the removable tactile input layer 162 of the split-keyboard structure 152 above the sealed input surface 174. In an embodiment, the sealed input surface 174 may be sealed such that liquids, dust, and other contaminants cannot enter into the base portion of the information handling system 100. This prevents those contaminants from damaging those hardware elements formed into the housing of the base portion of the information handling system 100.

In an example embodiment, the sealed input surface 174 may include a light guide layer 172. In an embodiment, the light guide layer 192 may be placed within the recessed housing well that is formed within the c-cover of the base chassis of the information handling system and secured to the c-cover using an adhesive, press fit, latch system, or magnetic device coupling in some example embodiments. This light guide layer 192 may serve as, at least, a portion of the sealed input surface 174 as well as a light transmission structure through which light emitted from the LEDs in the LED layer 178 of the keyboard sensing hardware structure 176 can be transmitted up and into the removeable tactile input layer 162 as described herein.

In an example embodiment, the keyboard sensing hardware structure 176 formed under the sealed input surface 164 may include a capacitive pads layer 180. The capacitive pads layer 180 includes a plurality of capacitive sensor pads that may correspond to each or a plurality of the keyboard keys in the removable tactile input layer 162 to detect capacitive changes due to actuation of those keyboard keys of the removable tactile input layer 162 above the sealed input surface 174 of a chassis of the information handling system. Further, the capacitive pads layer 180 includes a plurality of capacitive sensor pads to detect capacitive changes due to touch input by a user's fingers one keys or I/O structures on the removable tactile input layer in an embodiment. In yet another embodiment, the capacitive pads layer 180 may include the plurality of capacitive sensor pads that may detect capacitive changes due to sensing proximate location of the user's body part, including fingers or hand for a touchless gesture, above those keyboard keys of the removable tactile input layer 162 and above the sealed input surface 174 of the chassis of the information handling system.

In an embodiment, these capacitive sensor pads may be made of deposited carbon pads which may be delicate but are protected and sealed under the sealed input surface 174 of the chassis of the information handling system 100 for the keyboard sensing hardware structure 176. The deposited carbon capacitive sensing pads of the capacitive pads layer 180 have a benefit of very low cost and simple manufacturing via deposition or masked spraying to form these deposited carbon capacitive sensing pads. In an embodiment, these capacitive sensing pads of deposited carbon may be configured to vary an electric field in response to changes in nearby capacitance. These carbon-based patches may be arranged in a sensor matrix of capacitive sensing pads and may be printed, sputtered, or otherwise deposited on a non-conductive substrate such as an acrylonitrile butadiene styrene (ABS) polymer surface such as the underside of the sealed input surface 164. In other embodiments, the carbon-based patches may be arranged in a sensor matrix of capacitive sensing pads and may be printed, sputtered, or otherwise deposited on a thin FPC layer or a thin two-sided substrate membrane, such as a polyethylene terephthalate (PET) or other thermoplastic polymer membrane, for a thin keyboard sensing hardware structure 176 according to embodiments herein. Such a thin profile keyboard sensing hardware structure 176 enables a very thin split-keyboard stack structure 152 in a keyboard chassis as well as positioning of capacitive sensor pads and LEDs very close to the underside of the sealed input surface 164 for improved capacitive change detection of user inputs or illumination above the sealed input surface of the keyboard chassis. In an embodiment, the array of deposited carbon patches for the capacitive sensing pads in the capacitive pads layer 180 may be arranged such that each keyboard key of the removable tactile input layer 162 aligns vertically over the sealed input surface 174 with a deposited carbon patch capacitive sensing pads of the keyboard sensing hardware structure 176 formed under the sealed input surface 174 in embodiments herein.

In an embodiment, herein, the deposited carbon patches of the capacitive pads layer 180 may be formed on a top surface of a first layer of a multi-layer flexible printed circuit (FCP) board formed below the sealed input surface 174. In an embodiment, the LEDs of the LED layer 178 may also be formed on the top surface of the first layer of the multi-layer FCP board thereby forming a layer within the keyboard sensing hardware structure 176 where the LEDs are coplanar to the deposited carbon patches of the capacitive pads layer 180. In another embodiment, herein, the deposited carbon patches of the capacitive pads layer 180 may be formed on or into a thin two-sided substrate membrane, such as a PET or other thermoplastic polymer membrane formed below the sealed input surface 174. In an embodiment, the LEDs of the LED layer 178 may also be formed on or into the thin two-sided substrate membrane, such as the PET or other thermoplastic polymer membrane, thereby forming a membrane for the keyboard sensing hardware structure 176 where the LEDs are coplanar to the deposited carbon patches of the capacitive pads layer 180.

The location of the deposited carbon patches of the capacitive pads layer 180 directly below the sealed input surface 174 allows for the deposited carbon patches to be located very close to the removeable tactile input layer 162 and the user's fingers and hands. This results in a high press/no-press differentiation detection between keypress actuations, touch inputs, and touchless gesture inputs at the deposited carbon patches. The high differentiation in detection of the user's fingers and hands results in a higher signal-to-noise ratio (SNR) that allows a capacitive sensor microprocessor 186 executing machine readable code instructions of a capacitive sensor driver 188 to operate at a relatively low sensitivity setting. Further, the location of the deposited carbon patches close to the user's fingers and hands also reduces the interference and capacitive field reach needed to otherwise detect various user inputs at the deposited carbon patches. Still further, this arrangement of the deposited carbon patches of the capacitive pads layer 180 close to the removeable tactile input layer 162 decreases the thickness of the split keyboard stack structure 152 resulting in a thinner base chassis of the information handling system 100.

As described in embodiments herein, each of the plurality of capacitive sensor pads in the capacitive pads layer 180 may be operatively coupled to a capacitive sensor microprocessor 186 executing machine readable code instructions of a capacitive sensor driver 188. In an embodiment, each of the deposited carbon patches that form the plurality of capacitive sensors of the capacitive pads layer 180 may be operatively coupled to the capacitive sensor microprocessor 186 via etched copper traces in an FPC board embodiment or deposited carbon, silver, or carbon silver traces formed on the thin two-sided substrate membrane, such as the PET or other thermoplastic polymer membrane, in another embodiment. In yet other embodiments such as for the thin two-sided substrate membrane, such as the PET or other thermoplastic polymer membrane, conductive ink with silver or silver carbon may be printed to operatively coupled the LEDs in the thin two-sided substrate membrane in order to drive those LEDs. It is also appreciated that other types of traces may be formed to operatively couple the carbon pads to the capacitive sensor microprocessor 186 executing machine readable code instructions of the capacitive sensor driver 188 such as silver trances, copper traces, and/or indium tin oxide (ITO) that allow each of the deposited carbon patches or pads to conduct signals to the capacitive sensor microprocessor 186 for determination of a particular keypress of a keyboard key, determination of a user's touch input, and/or determination of a user's touchless gesture input at or near the keyboard keys or other I/O surfaces the removable tactile input layer 162 for the split-keyboard structure. The capacitive sensor driver 188 may be executed by the capacitive sensor microprocessor 186 to detect and determine which of the plurality of keys on the removable tactile input layer 162 have been pressed and detected at each of the plurality of capacitive sensor pads based on location and a detected level of capacitance change. The capacitive sensor microprocessor 186 executing the machine readable code instructions of the capacitive sensor driver 188 may relay these inputs to the hardware processor 102 for processing of keystrokes as input to the information handling system 100 in embodiments herein.

In some embodiments, the sealed input surface 174 may include an active shielding layer 182 to shield the plurality of capacitive sensors (e.g., the deposited carbon patches) within the capacitive pads layer 180 from a grounding layer 184. The active shielding pad(s) in an active shielding layer 182 may be held at the same or a similar voltage as the capacitive sensor pads in the capacitive pads layer 180 to mitigate parasitic capacitive grounding of the capacitive sensor pads to the nearby grounding layer 184 of the thin keyboard hardware sensing structure 176 of embodiments herein. The active shielding layer 182 forms a barrier requiring capacitive fields from the capacitive sensor pads to go around the active shielding pad or pads before being grounded by the grounding layer 184 thereby allowing a larger capacitive field distance for detection above the capacitive pads layer and above the sealed input surface 174 of the keyboard chassis. The grounding layer 184 may also serve as an internal and external electromagnetic interference (EMI) shield for information handling system hardware components inside the keyboard chassis as well as a grounding source for the split-keyboard structure. The grounding layer 184 may act as a controlled return path for noise from the components of the information handling system 100 and from external EMI that might otherwise disrupt the operation of the internal components of the information handling system 100 or other nearby computing devices in order to meet electronic specification codes.

In an embodiment, the active shielding layer 182 may be operatively coupled to a voltage source as controlled by the capacitive sensor microprocessor 186 such that the voltage level of the active shielding in the active shielding layer 182 is held at about that of the capacitive sensing pads of the capacitive pads layer 180 to prevent parasitic capacitive grounding of the capacitive sensing pads by the grounding layer 184. This grounding layer 184 is used for split-keyboard structure grounding and EMI and noise shielding but, due to the thin profile of the keyboard sensing hardware structure formed under the sealed input surface 174, is potentially close to the capacitive pads layer 180 which may disrupt the operation of the plurality of capacitive sensor pads (e.g., carbon pads) within the capacitive pads layer 180 via parasitically grounding capacitance of those capacitive sensing pads from detecting other capacitive changes due to user inputs. The active shielding layer 182 may be driven using the same voltage as the plurality of capacitive sensor pads within the capacitive pads layer 180 in some embodiments. This reduces parasitic capacitance between the plurality of capacitive sensor pads of the capacitive pads layer 180 and the grounding layer 184 placed below the active shielding layer 182. Thus, the active shielding layer 182 further improves SNR and extends capacitive sensing range of the plurality of capacitive sensor pads of the capacitive pads layer 180 in the keyboard sensing hardware structure formed under the sealed input surface 174.

As described, in some embodiments, the keyboard sensing hardware structure 176 may also include the grounding layer 184. In an embodiment, the grounding layer 184 may provide a stable electrical reference for the active circuitry of the keyboard sensing hardware structure 176 formed under the sealed input surface 174 and help to define signal baseline at the plurality of capacitive sensor pads by the capacitive sensor microprocessor 186. It is appreciated that other hardware components of the information handling system 100 may be placed below the grounding layer 184 and within the keyboard chassis that may include an information handling system hardware mainboard that may house the hardware processor 102, other processing devices (e.g., 104, 106, 108, 110), the PMU 130, the wireless interface adapter 134, the radio 136, the RF front end 138, and the antenna 140 among other hardware components. Thus, the grounding layer 184 may prevent any EMI and noise from those hardware components also from being affected by external EMI or affecting the operation of other nearby computing or electronic devices to the information handling system 100.

In an embodiment, the capacitive sensor microprocessor 170 may execute machine readable code instructions of a dynamic key mapping engine 190. The dynamic key mapping engine 190 may, upon switching types of removeable tactile input layers 162 such that the key layout is different, provide for operation of the newly installed removable tactile input layer 162 with the keyboard sensing hardware structure 176 formed under the sealed input surface 174. For example, a user may switch from a QWERTY-type keyboard layout of a first removable tactile input layer 162 to other types of keyboard key layouts that include, for example, Dvorak simplified keyboard, a Colemak keyboard, AZERTY keyboard, a QWERTZ keyboard, a Japanese Industrial Standard (JIS) keyboard, Hangul keyboard, and other language-specific layouts, region-specific layouts, task-specific layouts, and specialized keyboard layouts. Each of these different layouts of the various removable tactile input layers 162 may be detected using various detection devices including dedicated carbon patches, magnets, optical markers, NFC tags, RFID tags and the like that are placed on the underside of the removable tactile input layer 162 and detectable by sensors placed below the sealed input surface 174. By detecting the detection devices, the capacitive sensor microprocessor 186, executing the dynamic key mapping engine 190, may know the layout of the keyboard keys of the installed removable tactile input layer 162 and assign each of the plurality of capacitive sensors in the capacitive pads layer 180 the appropriate input characteristics based on the detected type of keyboard layout on the installed removable tactile input layer 162.

The systems and methods described herein, therefore, provides for a split-keyboard structure that can operate even when contaminants are accidentally introduced into the removable tactile input layer 162 such as liquids. If damaged, the mechanical keyboard keys of the removable tactile input layer 162 may be removed and replaced with another removable tactile input layer 162 for use with the keyboard sensing hardware structure 165 formed under the sealed input surface 164 and without replacement of the electronics for sensing keypress, touch, and touchless gesture inputs in embodiments herein. By bifurcating the split-keyboard structure into a purely mechanical removable tactile input layer 162 and the keyboard sensing hardware structure 176 formed under the sealed input surface 174, damage to the split-keyboard structure can be limited, from a spill for example, to the removable tactile input layer 162. The electronic devices of the keyboard sensing hardware structure 176 formed under the sealed input surface 174 in split-keyboard structure and the hardware components of the information handling system 100 remain sealed within the sealed input surface 174 and protected from damage. Still further, the split-keyboard structure of the present specification also provides for a swappable removable tactile input layer 162 that allows for repair or replacement of the removable tactile input layer 162 if and when contaminants have been introduced into the mechanical parts of the removable tactile input layer 162.

The split-keyboard structure 152 of the present specification also provides for a swappable removable tactile input layer 162 that accommodates for different types of keyboard layouts thereby accommodating for various typists who are using the information handling system 100. Because of the layout of the various layers of the split-keyboard structure, the split-keyboard structure may not only operate with the keyboard sensing hardware structure 176 formed under the sealed input surface 174 to recognize tactile input such as a keypress or touch input at the removable tactile input layer 162 but may also provide for illumination via an integrated LED layer 178 to illuminate the removable tactile input layer and even provide user interactive illumination feedback to recognized user inputs. For example, user inputs may include keypress inputs, or when a user's fingers are touching the keys in a user touch input, or are hovering over the keys of the split-keyboard structure for touchless gesture inputs. This allows for touchless gestures as well as touch inputs and keypresses to be received at the split-keyboard structure sensed by contactless capacitive sensing with the keyboard sensing hardware structure 176 formed under the sealed input surface 174. Touch input and touchless gestures may include swiping gestures and the like in order to provide various different types of input at the removable tactile input layer 162 of the split-keyboard structure than other keyboards may be capable of receiving. Even further, the dynamic key mapping engine 190 may identify the installed removeable tactile input layer 162 allowing the user to install, swap, and secure any type of removeable tactile input layer 162 to the sealed input surface 174 and immediately proceed to use that removeable tactile input layer 162 for input to the information handling system 100. Still further, the inclusion of the light guide layer 192 at the or a part of the sealed input surface 174 allows for LEDs of an LED layer 178 to provide a backlit split keyboard stack structure 152 in the split-keyboard structure described herein regardless of the removeable tactile input layer 162 installed.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
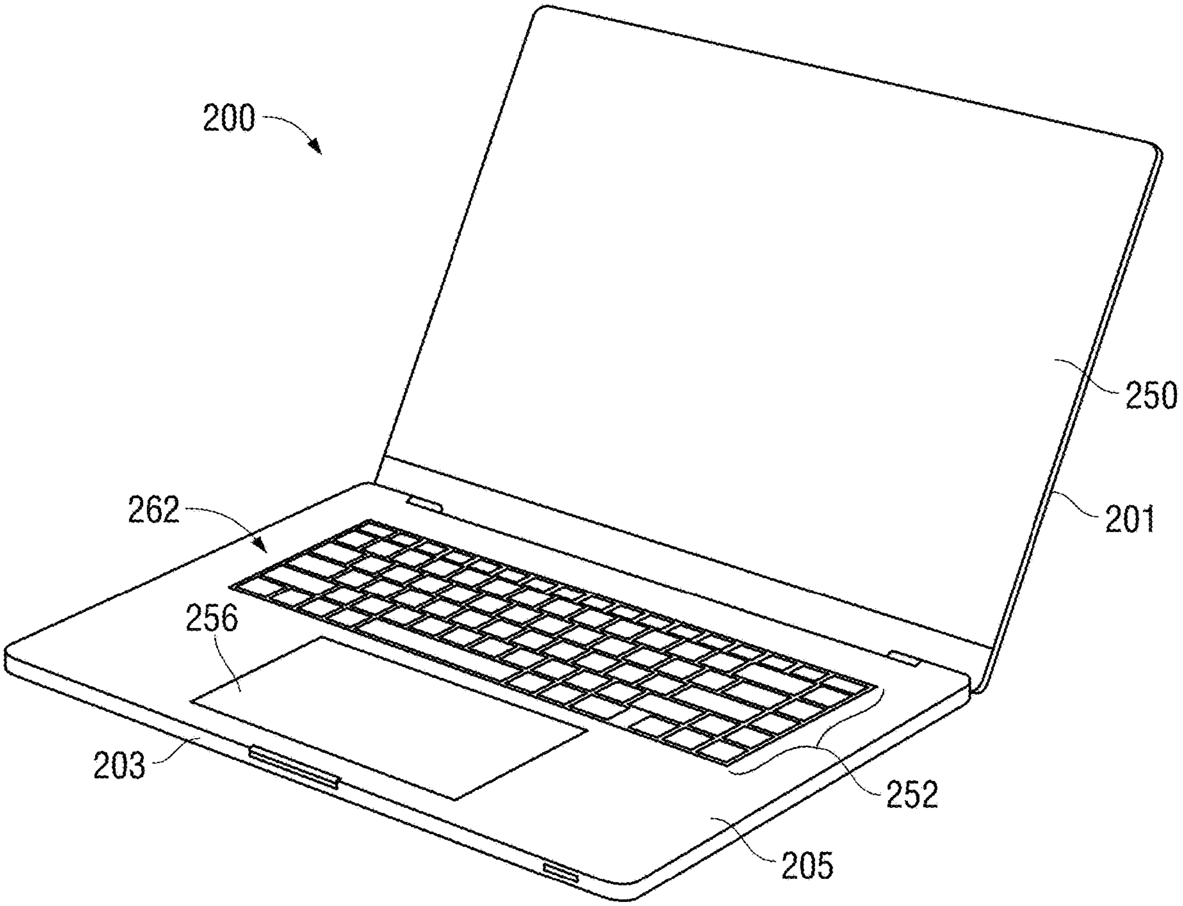
FIG. 2 is a graphic diagram perspective view illustrating an information handling system that includes a split keyboard stack structure in a base chassis having a removable tactile input layer and a separate sealed input surface having a keyboard sensing hardware structure formed under the sealed input surface to receive keyboard, touch, and gesture input from a user according to an embodiment of the present disclosure.

FIG. 2 is a graphic diagram illustrating an information handling system 200 that includes a keyboard 252 having a split-keyboard structure that includes a removable tactile input layer 262 and a separate sealed input surface (not shown) having a keyboard sensing hardware structure formed under the sealed input surface to receive keyboard, touch, and gesture input from a user according to an embodiment of the present disclosure. As described herein, the information handling system 200 may be a laptop-type information handling system 200. The laptop-type information handling system 200 may include a base chassis 203 and a display chassis 201. Therefore, FIG. 2 shows a lid portion of the laptop-type information handling system 200 that is a display chassis 201 that includes a video/graphics display device 250 to provide output to the user and for the user to provide input in those embodiments where the video/graphics display device 250 is a touchscreen display device. The laptop-type information handling system 200 also includes a base chassis 203, hinged to the display chassis 201, that may house information handling system hardware components as described in connection with FIG. 1 as well as various ports. The base chassis 203 in various embodiments further includes the separate keyboard sensing hardware structure formed under a sealed input surface (not shown) of the base chassis 203 and have a separate mechanical removable tactile input layer installed on top of the sealed input surface of the base chassis 201 according to embodiments herein. In an embodiment, portion of the c-cover of the base chassis 203 may include a recessed housing welled well portion that houses the removable tactile input layer 262 as described herein such as to accommodate the keyboard 252 as part of the removable tactile input layer 262.

In an embodiment, the base portion 203 of the laptop-type information handling system 200 may include the keyboard structure 252 in the removable tactile input layer 262 forming a first portion of the split-keyboard structure as described in embodiments herein. FIG. 2 shows the removeable tactile input layer 262 that has been coupled or otherwise installed into a recessed housing well of the c-cover 205 for the base chassis 203 and over the sealed input surface (not shown) as described in connection with FIG. 1. As described herein, the removeable tactile input layer 262 may include a keyboard structure 252 that may be any of a QWERTY-type keyboard layout of a first removeable tactile input layer 262 to other types of keyboard key layouts that include, for example, Dvorak simplified keyboard, a Colemak keyboard, AZERTY keyboard, a QWERTZ keyboard, a Japanese Industrial Standard (JIS) keyboard, Hangul keyboard, and other language-specific layouts, region-specific layouts, task-specific layouts, and specialized keyboard layouts. Each of these different layouts may be detected using various detection devices including dedicated carbon patches, magnets, optical markers, NFC tags, RFID tags and the like that are placed on the underside of the removeable tactile input layer 262 and detectable by sensors placed below the sealed input surface. By detecting the detection devices, the capacitive sensor microprocessor, executing the dynamic key mapping engine, may know the layout of the keys of the attached removable tactile input layer and assign each of the plurality of capacitive sensors in the capacitive pads layer the appropriate input characteristics based on the detected type of keyboard layout on the installed removable tactile input layer.

FIG. 2 also shows a trackpad 256 installed in the base portion 203 within the c-cover 205 of the laptop-type information handling system 200. This trackpad 256 may also be used by the user to provide input to the information handling system 200. In an embodiment, the trackpad 256 may form part of the removable tactile input layer 262 and may operate similarly to those keyboard keys present within the keyboard structure 252 of the removable tactile input layer 262 and be contactlessly detected by the separate keyboard sensing hardware structure formed under a sealed input surface in some embodiments. Alternatively, the trackpad 256 may form a different part of the top layer c-cover of the base chassis 203 of the information handling system 200 and may operate independently of the keyboard structure 252 that forms the removable tactile input layer 262. In the latter embodiment, the trackpad 256 operates to receive touch and clicks at the surface of the trackpad 256 with the trackpad 256 and includes trackpad electrical circuits to receive that input.

Figure 3A:
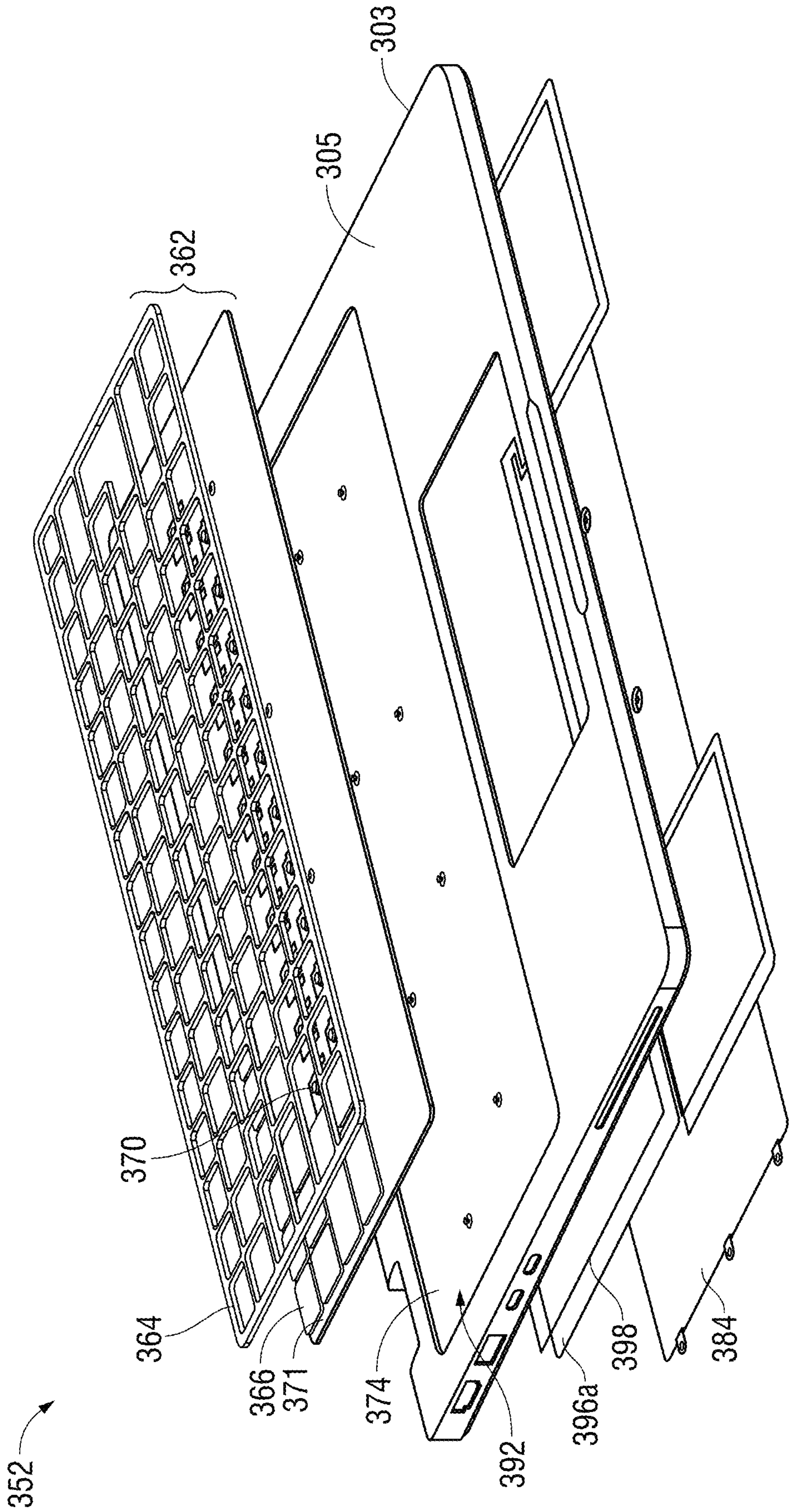
FIG. 3A is an exploded perspective view graphic diagram illustrating a split keyboard stack structure that includes a removable tactile input layer and a separate sealed input surface with a light guide to receive keyboard, touch, and gesture user input contactlessly at capacitive sensor pads and a plurality of light emitting diodes (LEDs) in a keyboard sensing hardware structure on a flexible printed circuit (FPC) formed under the sealed input surface according to an embodiment of the present disclosure.
Figure 3B:
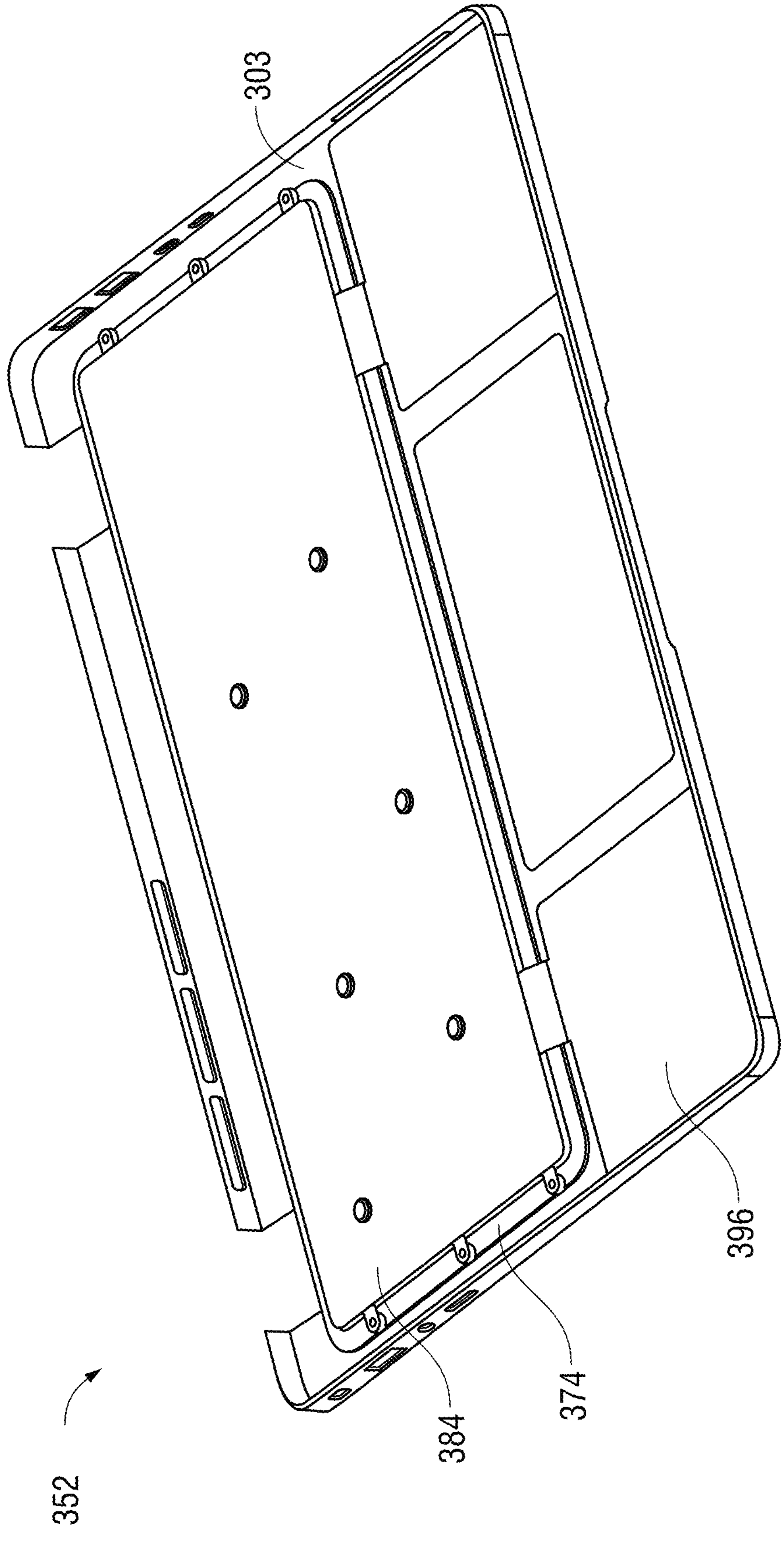
FIG. 3B is a bottom exploded perspective view graphic diagram illustrating a part of a split keyboard stack structure that includes the underside of a sealed input surface to receive keyboard, touch, and gesture input from a user contactlessly installed in an opening of a top cover or c-cover for a keyboard chassis of an information handling system according to an embodiment of the present disclosure.
Figure 3C:
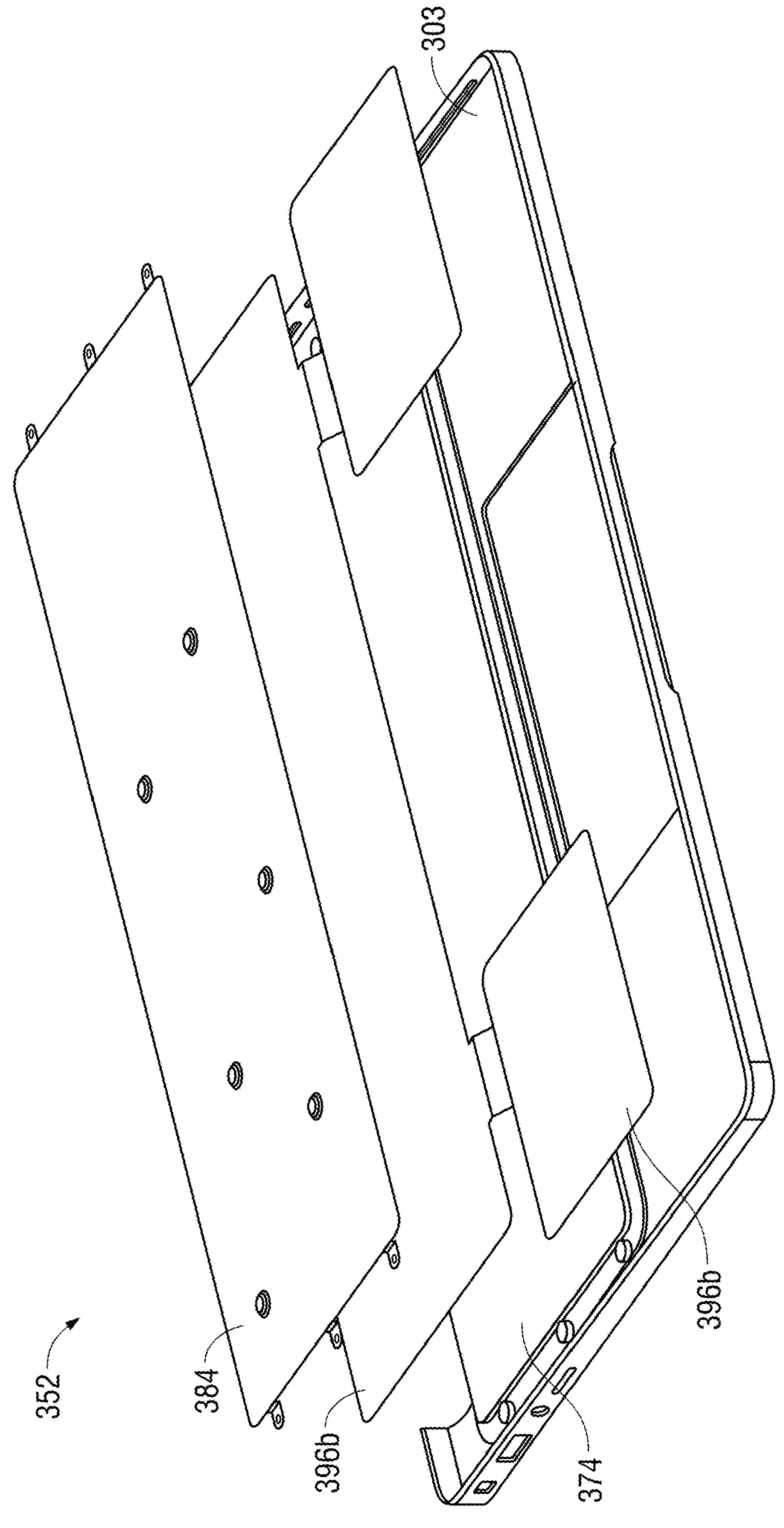
FIG. 3C is a bottom, exploded perspective view graphic diagram illustrating a portion of a split keyboard stack of an underside of a sealed input surface to receive keyboard, touch, and gesture user input contactlessly at capacitive sensor pads and a plurality of light emitting diodes (LEDs) of a keyboard sensing hardware structure formed in a thin two-sided substrate membrane under the sealed input surface according to an embodiment of the present disclosure.
Figure 3D:
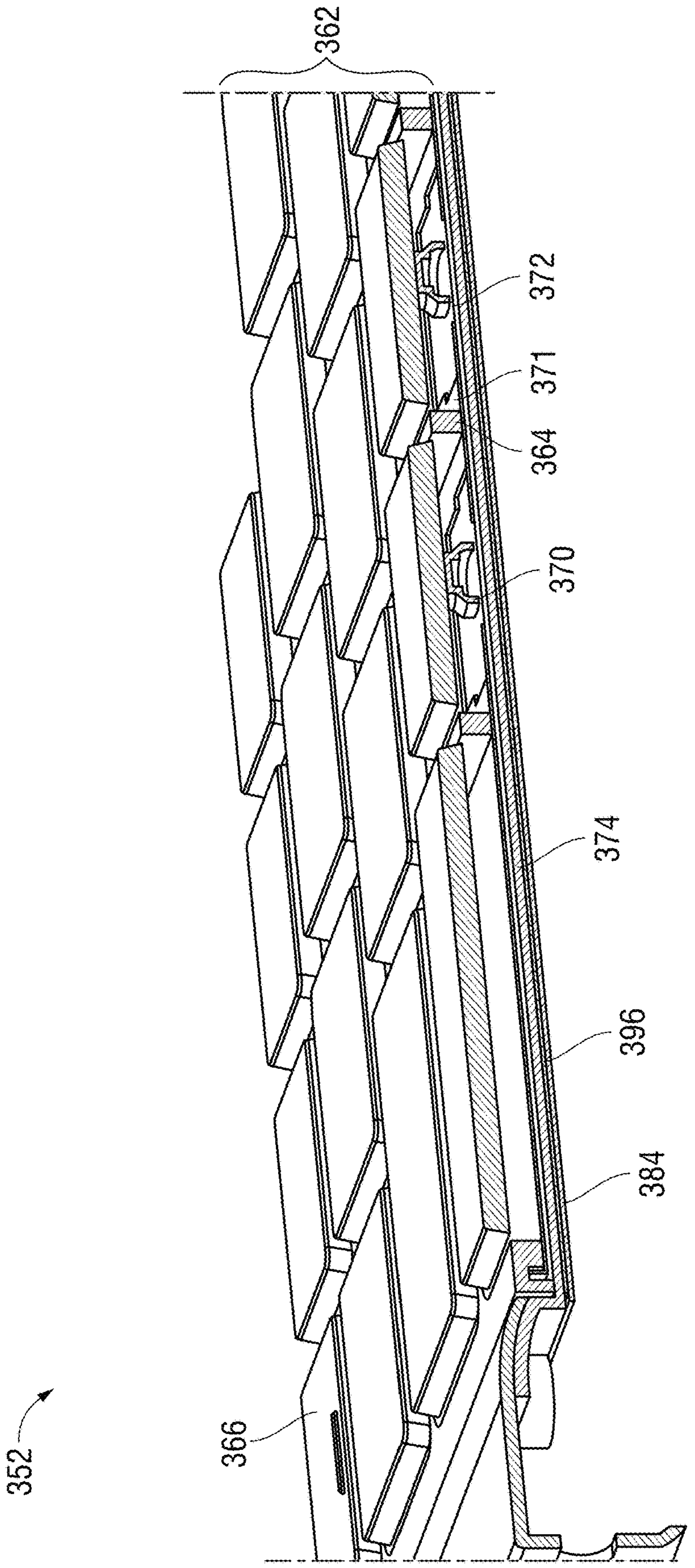
FIG. 3D is a side, section perspective view graphic diagram illustrating a split-keyboard stack that includes a removable tactile input layer installed above a separate sealed input surface with layers of a thin keyboard sensing hardware structure formed under the sealed input surface with a light guide layer to transmit light from a plurality of LEDs upwards towards the removable tactile input layer according to an embodiment of the present disclosure.

FIG. 3A is an exploded perspective view graphic diagram illustrating a split keyboard stack structure that includes a removable tactile input layer and a separate sealed input surface with a keyboard sensing hardware structure on a multi-sided flexible printed circuit (FPC) board layer formed under the sealed input surface having capacitive sensor pads to receive user input contactlessly and a plurality of LEDs to provide illumination according to an embodiment of the present disclosure. FIG. 3B is a bottom perspective view graphic diagram of a portion of an assembled split keyboard stack structure having capacitive sensor pads formed above a bottom grounding layer of a keyboard sensing hardware structure formed under a separate sealed input surface according to an embodiment of the present disclosure. FIG. 3C is a bottom, exploded perspective view of a graphic diagram illustrating a split keyboard stack that includes removable tactile input layer (not shown) and a separate sealed input surface with a keyboard sensing hardware structure formed in a thin two-sided non-conductive substrate membrane with capacitive sensor pads and LEDs formed under the sealed input surface according to an embodiment of the present disclosure. Further, FIG. 3D is a side, section perspective view graphic diagram illustrating a split-keyboard stack that includes a removable tactile input layer and a separate sealed input surface with light guide and a keyboard sensing hardware structure having capacitive sensor pads and a plurality of LEDs in a formed under the sealed input surface according to an embodiment of the present disclosure.

As described herein, the split keyboard structure 352 in the embodiments of FIGS. 3A to 3D may include a number of layers that form the interface through which the user may provide input to the information handling system that is capacitively detected. The removeable tactile input layer 362 may be a layer that a user interacts with to provide input to the information handling system but may include haptic feedback mechanical elements, but no electronics for detecting user inputs. This removeable tactile input layer 362 may include only mechanical elements such as mechanical keyboard keys that provide tactile response to the user when the mechanical keyboard keys are pressed. In the embodiments herein, the removeable tactile input layer 362 may include a keyboard keycap 366 operatively coupled to a keyboard key post (not shown) that interacts with a keyboard key rubber dome 370 forming one or more keyboard keys.

FIGS. 3A through 3D show example embodiments where the removeable tactile input layer 362 is operatively coupled against the sealed input surface 374 within a recessed housing well 392 portion of the base chassis 303 of the information handling system. As described herein, the removeable tactile input layer 362 (including a removable tactile input support frame 372, a removable lattice 364, a plurality of keyboard keycaps 366, a plurality of keyboard key posts, a plurality of keyboard key rubber domes 370, and the removable tactile input layer light transmissive membrane 372) may be operatively coupled to the base chassis 303 via any latching mechanism, interference fit structures, magnetic structures, or the like to secure the removeable tactile input layer 362 into this recessed housing well 392 in embodiments herein.

FIGS. 3A through 3D also show a sealed input surface 374 includes a light guide layer integrated therein or is formed of a light transmissive material to provide for transmission of light from LEDs disposed on or in a keyboard sensing hardware structure layer 396 that may be a multi-sided FPC board layer 396*a* or a thin two-sided non-conductive substrate membrane 396*b* in various embodiments herein. In an embodiment, the light guide layer may be light guide structures formed as part of or integrated into the sealed input surface 374. The sealed input surface 374 is placed within the recessed housing well 392 formed within c-cover 305 of the base chassis 303 of the information handling system and secured to the c-cover 305 using interference fit structures, magnets or magnetic material bars, latching structures, or an adhesive, for example. The interference fit structures, magnets or magnetic material bars, latching structures may be reciprocally located on an edge rim of the recessed housing well 392 or in or on the sealed input surface on one hand and located on the removable tactile input support frame 372 on the other hand. This light guide layer may serve as, at least, a portion of the sealed input surface 374 as well as a light transmission structure through which light emitted from the LEDs in the LED layer of the keyboard sensing hardware structure layer 396, that may be a multi-sided FPC board layer 396*a* or a thin two-sided non-conductive substrate membrane 396*b*. Light from the LEDs in the keyboard sensing hardware structure layer 396 may be transmitted up through the removable tactile input layer light transmissive membrane 372 and into the removeable tactile input layer 362 as described in embodiments herein.

As described an embodiment herein, the LEDs may be micro LEDs of the LED layer may be formed on a top surface of keyboard sensing hardware structure layer 396 that is a multi-layer FPC board 396*a* as shown in FIG. 3A with an adhesive layer or bead 398 to affix the keyboard sensing hardware structure layer 396 as multi-layer FPC board 396*a* to an underside of a sealed input surface 374. As described another embodiment herein, the LEDs may be micro LEDs of the LED layer may be formed into keyboard sensing hardware structure layer 396 that is a thin two-sided non-conductive substrate membrane 396*b* as shown in FIG. 3C that may be ultrathin and placed under an underside of a sealed input surface 374. Additionally, the deposited carbon patches of the capacitive pads layer (not shown) may be formed on a top surface of a first layer of the multi-layer FPC board 396*a* or the thin two-sided non-conductive substrate membrane 396*b* of the keyboard sensing hardware structure layer 396 formed under the sealed input surface 374. This places the carbon patches of the capacitive pad layer (not shown) coplanar to the LED layer. Due to the very thin profile of either the multi-layer FPC board 396*a* or the thin two-sided non-conductive substrate membrane 396*b* of the keyboard sensing hardware structure layer 396, the location of the deposited carbon patches of the capacitive pads layer directly below the sealed input surface 374 allows for the deposited carbon patches to be located very close to the removeable tactile input layer 362 and the user's fingers and hands. This results in a high press/no-press differentiation detection at the deposited carbon patches. The high differentiation in detection of the user's fingers and hands results in a higher signal-to-noise ratio (SNR) that allows a capacitive sensor microprocessor (not shown) executing machine readable code instructions of a capacitive sensor driver to operate at a relatively lower sensitivity setting (e.g., lower voltage supplied) or allows for greater sensitivity of capacitive change levels for various user inputs. Further, the location of the deposited carbon patches close to the user's fingers and hands also reduces the interference and improves capacitive field reach above the removable tactile input layer 362 that may be detected at the deposited carbon patches. Still further, this arrangement of the deposited carbon patches of the capacitive pads layer close to the removeable tactile input layer 362 decreases the thickness of the split keyboard structure 352 resulting in a thinner base chassis 303 of the information handling system.

In one embodiment shown in an example of FIG. 3A, an adhesive 398 may be used to secure the multi-layer FPC board 396*a* that forms the keyboard sensing hardware structure layer 396 formed under the sealed input surface 374 to a bottom surface of the sealed input surface 374 with a light guide layer. This adhesive 398 and the multi-layer FPC board 396*a* may also extend into the palm rest areas on the c-cover 305 of the base chassis 303 in order to add, in some embodiments, additional input surface area across the top surface c-cover 305 or even a touchpad within of the base chassis 303. In an embodiment, those deposited carbon patches of the capacitive pads layer formed on that portion of the multi-layer FPC board 396*a* that extends into the palm rest areas of the base chassis 303 may detect user presence or resting of the user's hands on the c-cover 305 of the base chassis 303. It is appreciated that the multi-layer FPC board 396*a* forming the keyboard sensing hardware structure layer 396 formed under the sealed input surface 374 in FIG. 3A may instead be the thin two-sided non-conductive substrate membrane 396*b* that is very thin but requires no adhesive layer or bead 398 in other embodiments in a variation of FIG. 3A and shown in more detail in FIG. 3C.

As described in embodiments herein, the light guide layer 392 and removable tactile input layer light transmissive membrane 372 allow for the light emitted from the LEDs 394 to pass up and into the removeable tactile input layer 362 in openings of the removable tactile input support frame 372. This allows, at least, for a backlighting effect at the removeable tactile input layer 362 installed into the recessed housing well 392 formed into the base chassis 303. In an embodiment, the LEDs 394 may emit a plurality of different colors of light thereby enhancing the aesthetic qualities of the split keyboard structure 352 or providing for user interactive illumination feedback for various user inputs. In an embodiment, the user may be provided with a user interface at the digital display device (not shown) of the information handling system that allows a user to customize the color of light emitted by the plurality of LEDs 394 within the LED layer.

As described herein, the keyboard sensing hardware structure layer 396 that may be the multi-sided FPC board layer 396*a* or the thin two-sided non-conductive substrate membrane 396*b* the multi-layer FPC board 396*a* may include second and third layers onto or into which the active shield pads of an active shielding layer (not shown) and a grounding layer 384 are formed. The active shielding layer may shield the plurality of capacitive sensors (e.g., the deposited carbon patches) within the capacitive pads layer from parasitic capacitive grounding by the grounding layer 384 by requiring capacitive fields to go around the capacitive shielding pad or pads to reach ground and extending the capacitive field reach above the sealed input surface 374. The grounding layer 384 may serve as an EMI shield for the base chassis 303 and grounding for the split-keyboard structure. In some embodiment, the grounding layer 384 may either form a separate layer as shown in FIG. 3A through 3D or may be part of the keyboard sensing hardware structure layer 396 that may be a multi-sided FPC board layer 396*a* or a thin two-sided non-conductive substrate membrane 396*b* in various embodiments.

In an embodiment, the active shielding layer may be operatively coupled to a voltage source as controlled by the capacitive sensor microprocessor such that the voltage level of the active shielding in the active shielding layer is held at the same or similar voltage potential as that of the capacitive sensing pads of the capacitive pads layer to prevent parasitic capacitive grounding of the capacitive sensing pads by the grounding layer 384. The active shielding layer may be driven using the same voltage as the plurality of capacitive sensor pads within the capacitive pads layer of the keyboard sensing hardware structure layer 396 in some embodiments. This reduces parasitic capacitance between the plurality of capacitive sensor pads of the capacitive pads layer and the grounding layer 384 placed below the active shielding layer. Thus, the active shielding layer further improves SNR and extends capacitive sensing range of the plurality of capacitive sensor pads of the capacitive pads layer in the keyboard sensing hardware structure formed under the sealed input surface 374.

In an embodiment shown in FIG. 3C, the deposited carbon patches of the capacitive pads layer may be formed into or on a top surface of a thin two-sided non-conductive substrate membrane 396*b* formed below the sealed input surface 374 (shown above in the bottom view of FIG. 3C. In this embodiment, instead of the multi-layer FPC board 396 as shown in FIG. 3A, the deposited carbon patches may be formed onto a surface of a thin two-sided non-conductive substrate membrane 396*b* that may be made of polyethylene terephthalate (PET), for example, and ultrathin for installation against the underside of the sealed input surface 374. In an embodiment, the LEDs of the LED layer may also be formed into the two-sided non-conductive substrate membrane 396*b* thereby forming a layer within the keyboard sensing hardware structure 396 where the LEDs are coplanar to the deposited carbon patches of the capacitive pads layer. The location of the deposited carbon patches of the capacitive pads layer directly below the sealed input surface 374 allows for the deposited carbon patches to be located very close to the removeable tactile input layer 362 and the user's fingers and hands. This results in a high press/no-press differentiation detection at the deposited carbon patches. The high differentiation in detection of the user's fingers and hands results in a higher SNR that allows a capacitive sensor microprocessor executing machine readable code instructions of a capacitive sensor driver to operate at a relatively low sensitivity setting. Further, the location of the deposited carbon patches close to the user's fingers and hands also reduces the interference and increases capacitive field reach that may detected at the deposited carbon patches. Still further, this arrangement of the deposited carbon patches of the capacitive pads layer close to the removeable tactile input layer 362 and placed on the thin two-sided non-conductive substrate membrane 396*b* decreases the thickness of the split keyboard structure 352 resulting in a thinner base chassis 303 of the information handling system.

In an embodiment, a grounding layer 384 (e.g., FIG. 3D) may provide a stable electrical reference for the active circuitry of the keyboard sensing hardware structure formed under the sealed input surface 374 and help to define signal baseline at the plurality of capacitive sensor pads by the capacitive sensor microprocessor. It is appreciated that other hardware components of the information handling system may be placed below the grounding layer 384 that may include an information handling system hardware mainboard that may house a hardware processor, other processing devices, a PMU, a wireless interface adapter, a radio, an RF front end, and an antenna among other hardware components described herein. Thus, the grounding layer 384 may prevent any EMI and noise to or from those hardware components to comply with electronic device requirements as described herein.

Figure 4A:
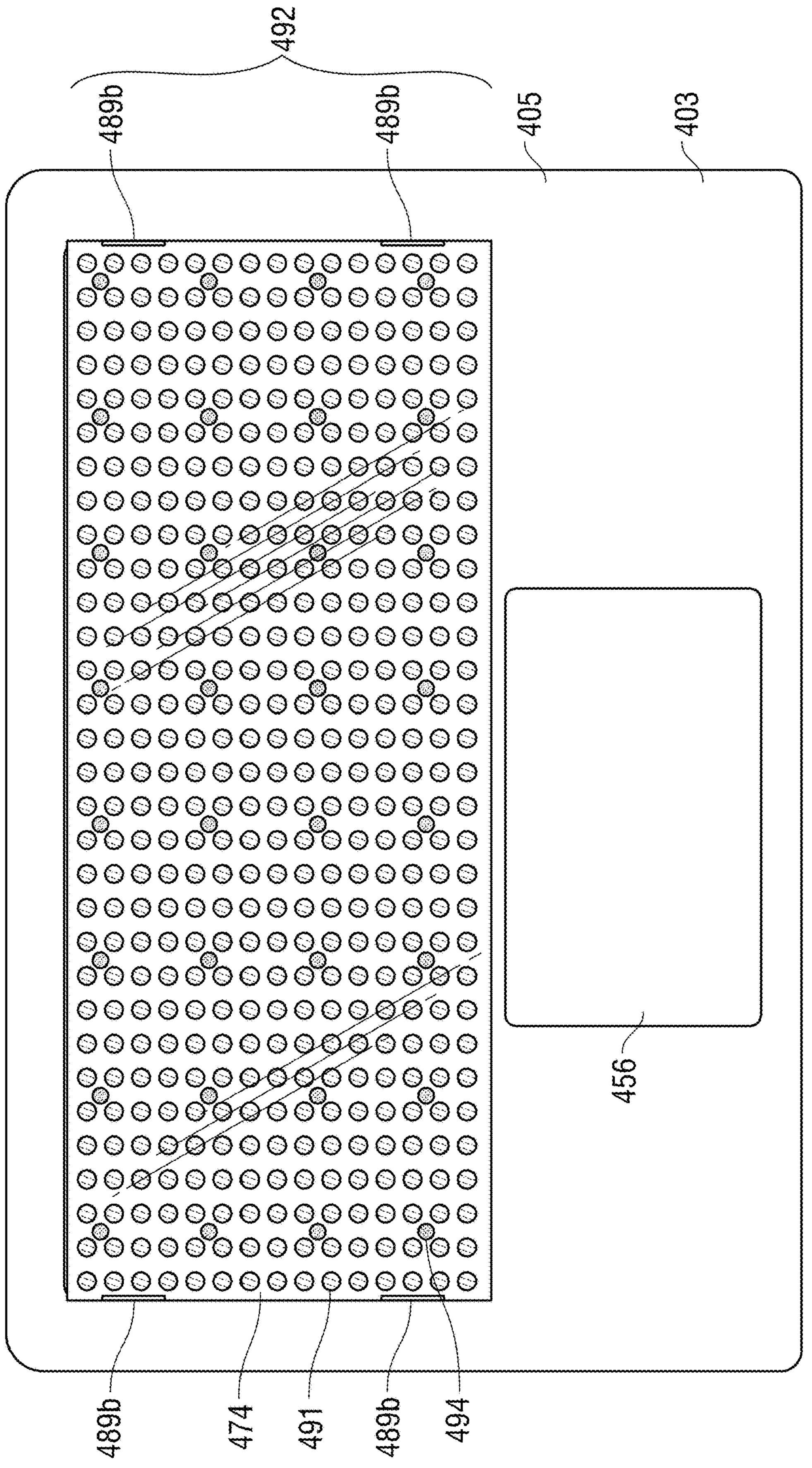
FIG. 4A is a top view graphic diagram of a sealed input surface of a split keyboard stack structure installed within a recessed housing well in a c-cover of a base chassis for a laptop-type information handling system formed to fit and receive a swappable removable tactile input layer according to an embodiment of the present disclosure.
Figure 4B:
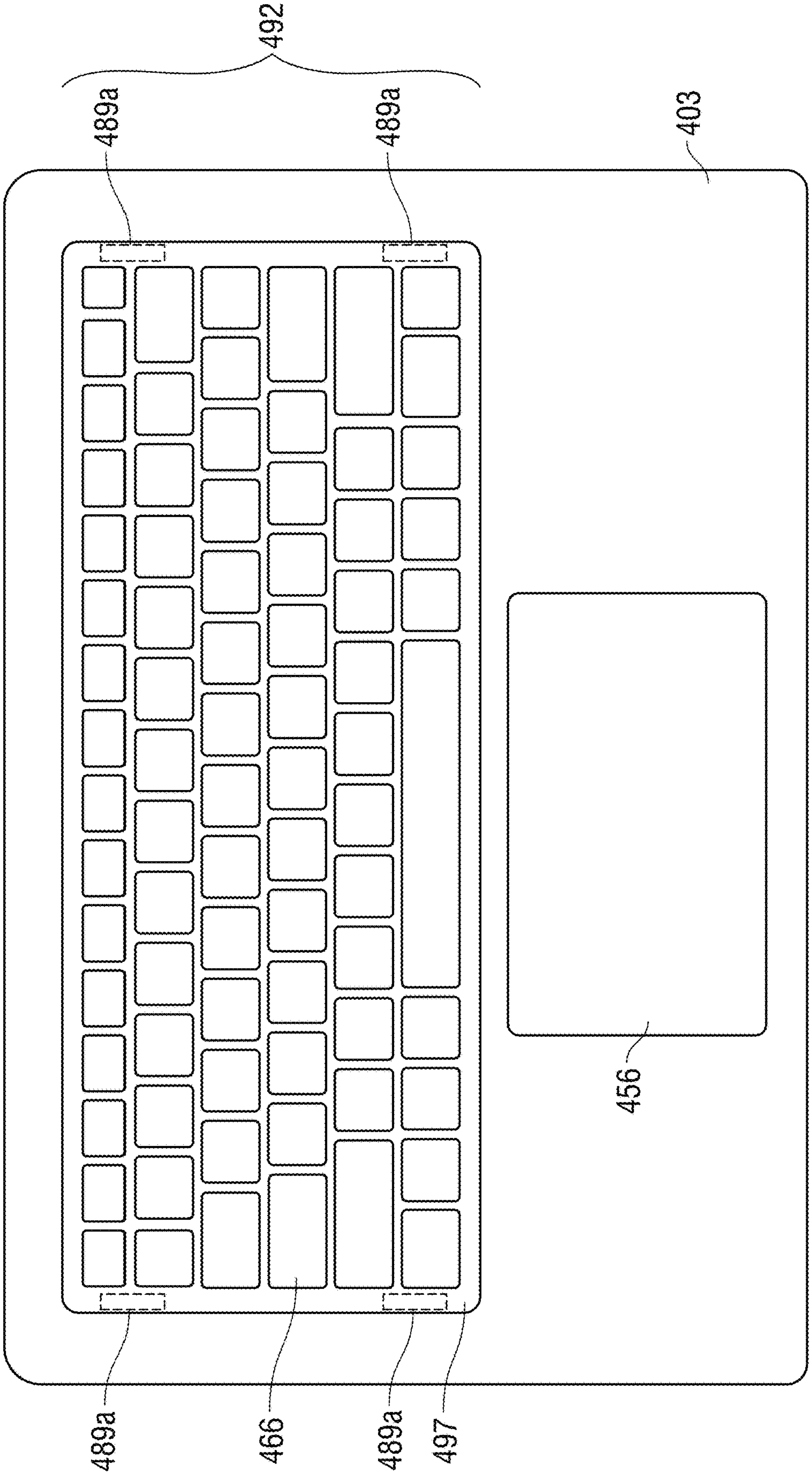
FIG. 4B is a top view graphic diagram of a keyboard removable tactile input layer installed on a sealed input surface of a split keyboard stack structure within a recessed housing well in a c-cover of a base chassis of a laptop-type information handling system formed to fit and receive the keyboard removable tactile input layer according to an embodiment of the present disclosure.
Figure 4C:
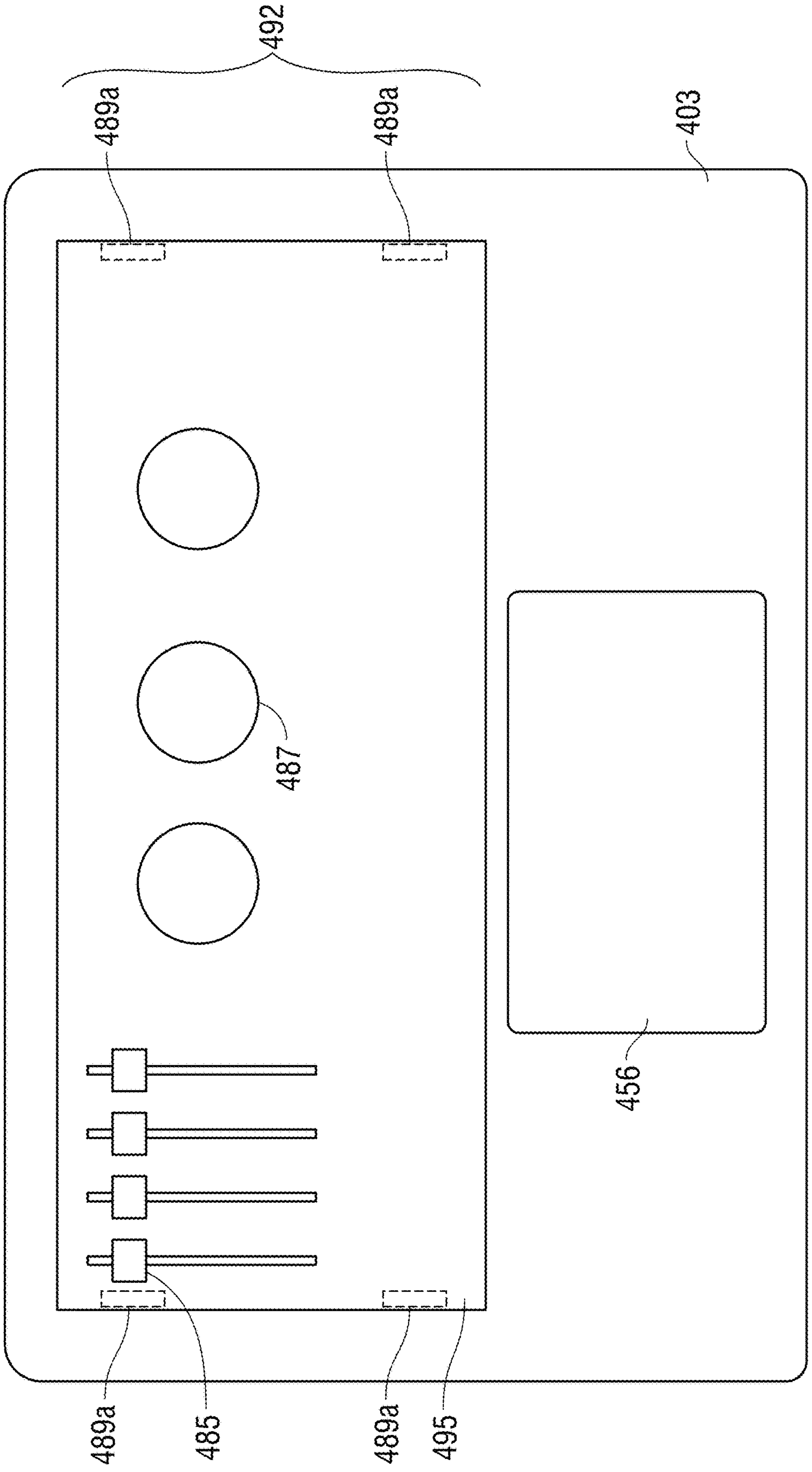
FIG. 4C is a top view graphic diagram of a control board-type removable tactile input layer installed on a sealed input surface of a split keyboard stack structure within a recessed housing well in a c-cover of a base chassis of a laptop-type information handling system formed to fit and receive the control board-type removable tactile input layer according to an embodiment of the present disclosure.
Figure 4D:
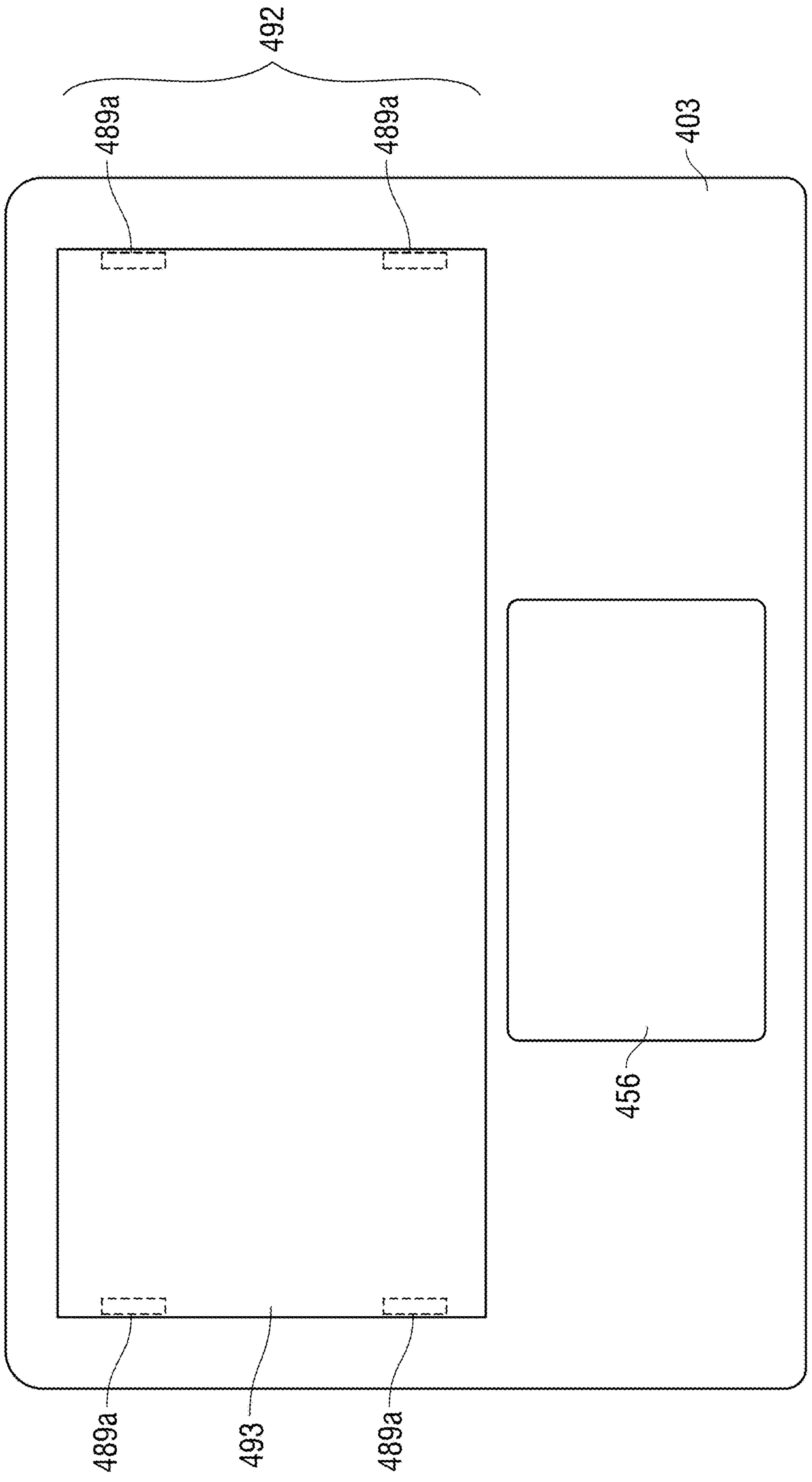
FIG. 4D is a top view graphic diagram of a drawing pad-type removable tactile input layer installed on a sealed input surface of a split keyboard stack structure within a recessed housing well in a c-cover of a base chassis of a laptop-type information handling system formed to fit and receive the drawing pad-type removable tactile input layer according to an embodiment of the present disclosure.

FIG. 4A is a top view graphic diagram of a keyboard portion of a laptop-type information handling system including a recessed housing well with a sealed input surface formed in the c-cover of a base chassis of an information handling system to fit and receive a swappable removable tactile input layer (not shown) according to an embodiment of the present disclosure. FIG. 4B is a top view graphic diagram of a keyboard-type swappable removable tactile input layer placed within a recessed housing well formed in a c-cover of a base chassis of an information handling system according to an embodiment of the present disclosure. FIG. 4C is a top view graphic diagram of a control board-type swappable removable tactile input layer placed within a recessed housing well formed in a c-cover of a base chassis of an information handling system according to an embodiment of the present disclosure. FIG. 4D is a top view graphic diagram of a drawing pad-type swappable removable tactile input layer placed within a recessed housing well formed in a c-cover of a base chassis of an information handling system according to an embodiment of the present disclosure.

The keyboard chassis 403 with c-cover 405 shown in FIG. 4A illustrates the recessed housing well 492 with a sealed input surface 474 formed in the bottom for an information handling system base chassis in an embodiment. The recessed housing well 492 with the sealed input surface 474 is sized to fit and includes reciprocal interference fit structures, reciprocal latching structures, reciprocal magnetic structures 489 *a* and 489*b* or the like to receive a swappable removable tactile input layer (not shown) according to an embodiment of the present disclosure. It is appreciated that the removable tactile input layer may be a multipiece or single piece and include a removable tactile input layer support frame or tray that is operatively coupled to a sealed input surface 474 within the recessed housing well 492 in various embodiments. In the examples shown in FIG. 4A through 4D, however, the removeable tactile input layer may any of the keyboard-type removeable tactile input layer 497, a control board-type removable tactile input layer 495, or the drawing pad-type removable tactile input layer 493 that is inserted into the recessed housing well 492 formed within a housing of the base chassis 403 of a laptop-type information handling system. FIG. 4A, therefore, shows the base chassis 403 of the information handling system without one of the removable tactile input layer placed within the recessed housing well 492. This allows for the sealed input surface 474 which includes a light guide layer to be seen. As described herein, this sealed input surface 474 may seal the remaining portions of the base chassis 403 of this laptop-type information handling system from contaminants and liquids. FIG. 4A also shows where the capacitive sensor pads locations 491 of the capacitive pads layer are formed underneath the sealed input surface 474 with light guide layer in order to capture, at any of the keyboard-type removeable tactile input layer 497, the control board-type removable tactile input layer 495, or the drawing pad-type removable tactile input layer 493, user input as described herein.

In the examples embodiments in FIGS. 4A through 4D, each of the removeable tactile input layers (e.g., keyboard-type removeable tactile input layer 497, control board-type removable tactile input layer 495, drawing pad-type removable tactile input layer 493) includes a second magnet 489*a* that aligns with a second magnet 489*b* disposed in the sealed input surface 474. Because the first magnet 489*a* is aligned with the second magnet 489*b*, as the removeable tactile input layer (e.g., 493, 495, 497) is operatively coupled on top of the sealed input layer since the first magnet 489*a* and the second magnet 489*b* are attracted together. In other embodiments, either the first magnet 489*a* or the second magnet 489*b* may be a ferromagnetic material bar or structure that attracts the other.

FIGS. 4B through 4D show individual removeable tactile input layers, such as 493, 495, 497, are placed within the recessed housing well 492 shown in FIG. 4A. FIG. 4B, for example, shows a keyboard-type removeable tactile input layer 497 placed within the recessed housing well 492. As described herein, the keyboard-type removeable tactile input layer 497 includes any number of input keyboard keys (each keyboard keycap 466 being viewable in FIG. 4B) for the user to acuate. The actuation of keyboard keys of the keyboard-type removable tactile input layer 497 is detected via the one or more keyboard sensing hardware structures of the split keyboard stack structure described herein. Additionally, the keyboard-type removeable tactile input layer 497 includes the first magnets 489*a* used to interface with the second magnets 489*b* within the sealed input surface 474 as shown in FIG. 4A in an embodiment.

FIG. 4C shows a control board-type removable tactile input layer 495 placed within the recessed housing well 492 shown in FIG. 4A. As described herein, the control board-type removable tactile input layer 495 includes any number of knobs 487 and sliders 485 for the user to acuate and be detected via the keyboard sensing hardware structure as described in embodiments of the split keyboard stack structures herein. Additionally, the control board-type removable tactile input layer 495 includes the first magnets 489*a* used to interface with the second magnets 489*b* within the sealed input surface 474 as shown in FIG. 4A.

FIG. 4D shows a drawing pad-type removable tactile input layer 493 placed within the recessed housing well 492 shown in FIG. 4A. As described herein, the drawing pad-type removable tactile input layer 493 includes a flat surface for the user to interface with a user's finger or a stylus such that the finger or stylus may be detected via the keyboard sensing hardware structure described in embodiments of the split keyboard stack structures herein. Additionally, the drawing pad-type removable tactile input layer 493 includes the first magnets 489*a* used to interface with the second magnets 489*b* within the sealed input surface 474 as shown in FIG. 4A. It is appreciated that each of the base chassis 403 shown in FIGS. 4A through 4D include a trackpad 456 that may be used by the user to provide additional input to the information handling system as well.

Figure 5:
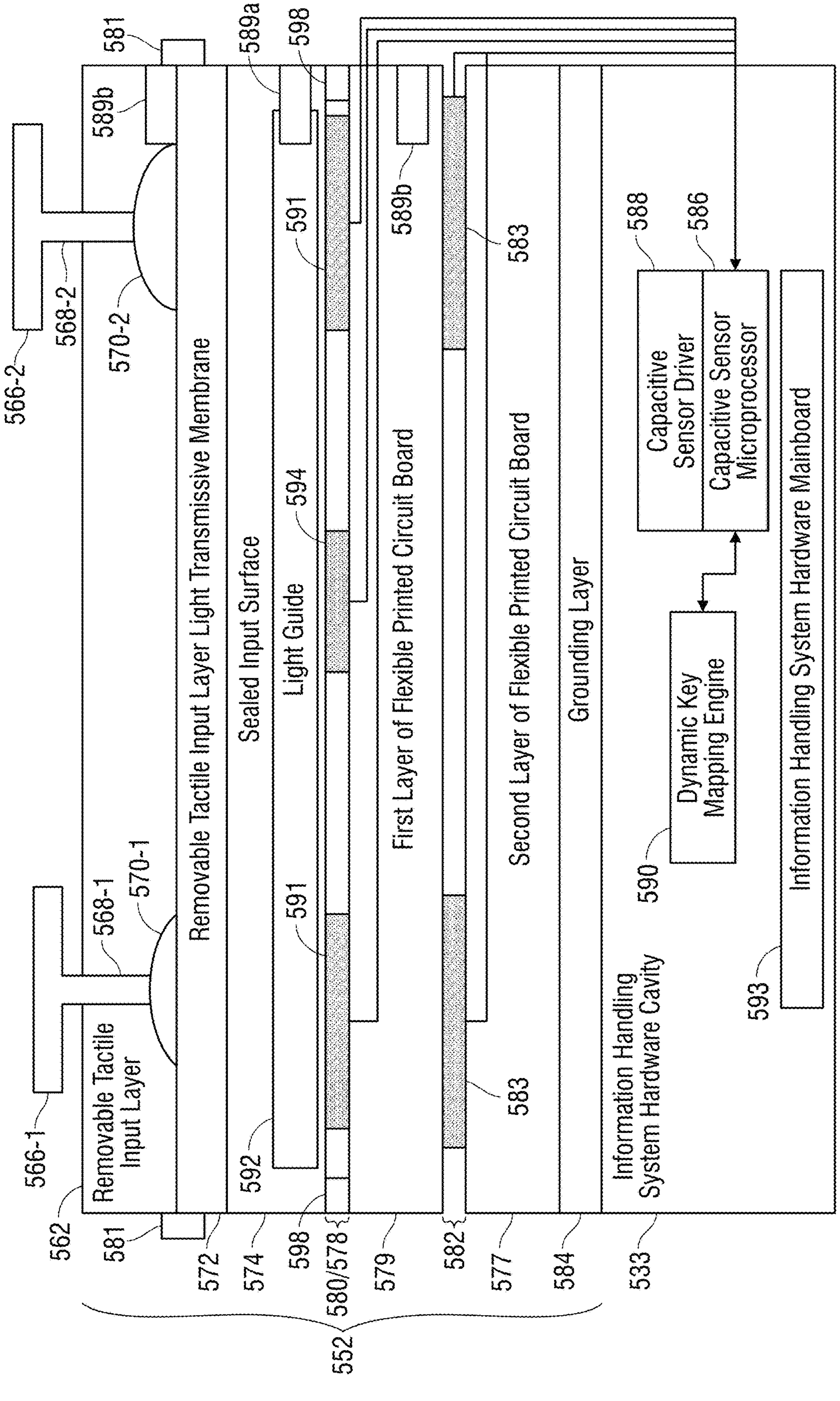
FIG. 5 is a graphic and block diagram illustrating a split keyboard stack structure that includes removable tactile input layer, a separate sealed input surface, and a keyboard sensing hardware structure on an FPC layer to receive keyboard, touch, and gesture input from a user contactlessly at capacitive sensor pads and having lighting formed under the sealed input surface according to an embodiment of the present disclosure.

FIG. 5 is a graphic and block diagram illustrating a split keyboard stack structure that includes removable tactile input layer and a separate sealed input surface with a keyboard sensing hardware structure formed on a multi-sided FPC board layer under the sealed input layer to capacitively receive keyboard, touch, and gesture user input according to an embodiment of the present disclosure. As described herein, the split keyboard stack structure 552 may include a number of layers that form the interface through which the user may provide input to the information handling system.

A removeable tactile input layer 562 may be that layer that a user interacts with to provide user input to the information handling system such as with a finger or a hand. This removeable tactile input layer 462 may include only mechanical elements such as mechanical keyboard keys that provide tactile response to the user when the mechanical keyboard keys are pressed. In a specific example, the removeable tactile input layer 562 may include mechanical keyboard keys that each include a keyboard keycap 566-1, 566-2, operatively coupled to a keyboard key rubber dome 570-1, 570-2 via a keyboard key post 568-1, 568-2. In this example embodiment, instead of the keyboard key rubber dome 570-1, 570-2 and keyboard key post 568-1, 568-2*a* engaging a switch or activating a switch on a PCB, the keyboard key rubber dome 570-1, 570-2 may be used only to help provide tactile feedback to the user. In this example embodiment, the removeable tactile input layer 562 may also include scissor or butterfly arms that also provide tactile feedback to the user while facilitating the recoil of the keyboard keys upwards. Thus, in the removeable tactile input layer 562 provides a simulated tactile feel to the user such that the user may feel as if the user is actuating the keyboard keys.

However, the removeable tactile input layer 562 does not include any electrical elements that are used to receive electrical signals as the user presses the keys. Therefore, in the embodiments herein, the removeable tactile input layer 562 does not include a PCB layer, a flexible PCB layer, or other electrical components that other keyboards may use to detect the press of a key by the user. Instead, in the embodiments herein, the split keyboard stack structure 552 includes a separate layer or layers of a keyboard sensing hardware structure formed under a sealed input surface 574 of a keyboard chassis that can detect user input. Therefore, the electrical components of the split keyboard stack structure 552 cannot be damaged if liquid or other contaminants are introduced into the removeable tactile input layer 562. In an example embodiment, user keypress or touch inputs via each mechanical keyboard key may rely on the presence of the user's finger to be capacitively detected by one or more of the plurality of capacitive sensor pads 591 in the keyboard sensing hardware structure formed under the sealed input surface 574 as described herein. The detected change in capacitance, as detected by the plurality of capacitive sensor pads 591 in a capacitive pads layer 580, however, may vary depending on the size and moisture level, for example, of the user's finger.

In an embodiment, the removeable tactile input layer 562 may further include a removable tactile input layer light transmissive membrane 572. The removable tactile input layer light transmissive membrane 572 formed adjacent to a removable tactile input layer support frame membrane with one or more pass-through openings that allows for light to pass up and into the removeable tactile input layer 562. In an example embodiment, the removable tactile input layer light transmissive membrane 572 may be made of a plastic that is transparent or translucent. In an embodiment, the removable tactile input layer light transmissive membrane 572 may be made of a translucent material that scatters or diffuses a light emitted from one or more LEDs 594 of a LED layer 578 formed below the sealed input surface 574. This may create a lighted backlight for the split keyboard stack structure 552 despite the split-keyboard structure and a removable tactile input layer membrane frame of a removable tactile input layer 562 as described herein.

Similar to FIGS. 4A through 4D, FIG. 5 shows the removeable tactile input layer 562 is operatively coupled to the sealed input surface 574. This may be accomplished using an adhesive in an embodiment. In an embodiment, the adhesive layer may include any type of glue, tape, or other adhesive that may, at least temporarily, adhere the bottom surface of the removeable tactile input layer 562 to a top surface of the sealed input surface 574 that may include any type of sealed surface. In another example, a latching mechanism or interference fit mechanism 581 may be used. In an example embodiment, the removeable tactile input layer 562 may be coupled to the sealed input surface 574 using a latching or interference fit mechanism 581 or other coupling device having reciprocal structures on the removable tactile input layer 562 and on the sealed input surface 574 or a recessed housing well surrounding the same in embodiments herein to allow a user to decouple the removeable tactile input layer 562 from the sealed input surface 574. This latching or interference fit mechanism 581 allows a user to quickly decouple the removeable tactile input layer 562 from the sealed input surface 574 in order to repair the removeable tactile input layer 562 or replace the removeable tactile input layer 562 as described herein. In yet another example embodiment, the removeable tactile input layer 562 includes a second magnet 589*b* that aligns with a first magnet 589*a* disposed in the sealed input surface 574 for magnetic coupling. Because the first magnet 589*a* is aligned with the second magnet 589*b*, as the removeable tactile input layer 562 is placed near the sealed input surface 574, the first magnet 589*a* and the second magnet 589*b* are attracted together and the removeable tactile input layer 562 is operatively coupled to the sealed input surface 574. Either of the first magnet 589*a* or second magnet 589*b* may be a ferromagnetic material structure instead in some embodiments.

As described herein, a separate half of the split keyboard stack structure 552 includes, as a top layer of a keyboard chassis of an information handling system, the sealed input surface 574 that includes a light guide layer 592. In an embodiment, the sealed input surface 574 with light guide layer 592 may be placed within the recessed housing well that is formed within the c-cover of the base chassis of the information handling system and secured to the c-cover using an adhesive, latching mechanism, interference fit mechanism, magnet structure or others. This light guide layer 592 may serve as, at least, a portion of the sealed input surface 574 that is a light transmission structure or the sealed input surface 574 itself may be transparent or translucent to light as well such that light emitted from the LEDs 594 in the LED layer 578 can be transmitted up and into the removeable tactile input layer 562 as described herein.

In an example embodiment, the keyboard sensing hardware structure formed under the sealed input surface 574 may be formed of a plural-sided FPC board that includes a capacitive pads layer 580 having plural capacitive sensor pad 591 and one or more LEDs 594 of a LED layer 578. In an embodiment, the multi-sided FPC board layer of the keyboard sensing hardware structure may be coupled under the sealed input surface 574 to using, for example, an thin adhesive bead or layer 598. The multi-sided FPC board layer of the keyboard sensing hardware structure may include a first FPC board layer 579 and a second multi-sided FPC board layer 577 of the keyboard sensing hardware structure formed under the sealed input surface 574 having a capacitive pads layer 580 with an LED layer 578 and an active shielding layer 582. As shown in FIG. 5, the adhesive layer 598 may be a bead formed around a perimeter of the multi-sided FPC board layer of the keyboard sensing hardware structure under the sealed input surface 574 that includes the light guide 592. However, the present specification contemplates that an adhesive 598 may be placed at any location between the sealed input surface 574 and the keyboard sensing hardware structure as the first and second multi-sided FPC board layers 579/577.

In an embodiment, the capacitive pads layer 580 may be formed on the multi-sided FPC board layer to include a plurality of capacitive sensor pads 591 that may correspond to each or a plurality of the keyboard keys in the removable tactile input layer 562 to detect capacitive changes due to actuation of those keyboard keys of the removable tactile input layer 562 above the sealed input surface 574 of a keyboard chassis of the information handling system. Further, the capacitive pads layer 580 includes a plurality of capacitive sensor pads 591 to detect capacitive changes due to touch input by a user's fingers on keys or I/O structures on the removable tactile input layer in an embodiment. In yet another embodiment, the capacitive pads layer 580 may include the plurality of capacitive sensor pads 591 that may detect capacitive changes due to sensing proximate location of the user's body part, including fingers or hand for a touchless gesture, above those keyboard keys of the removable tactile input layer 562 and above the sealed input surface 574 of the keyboard chassis of the information handling system.

In an embodiment, these capacitive sensor pads 591 may be made of deposited carbon pads which may be delicate but are protected and sealed under the sealed input surface 574 of the chassis of the information handling system for the keyboard sensing hardware structure 584. The deposited carbon capacitive sensing pads 591 of the capacitive pads layer 580 have a benefit of very low cost and simple manufacturing via deposition or masked spraying to form these deposited carbon capacitive sensing pads 591. In an embodiment, these capacitive sensing pads 591 of deposited carbon may be configured to vary an electric field in response to changes in nearby capacitance. These carbon-based patches may be arranged in a sensor matrix of capacitive sensing pads 591 and may be printed, sputtered, or otherwise deposited on a non-conductive substrate such as an ABS polymer surface such as the underside of the sealed input surface 564 or the first multi-sided FPC board layer 579 of the keyboard sensing hardware structure at very low cost. In an embodiment, the array of deposited carbon patches for the capacitive sensing pads 591 in the capacitive pads layer 580 may be arranged such that each keyboard key of the removable tactile input layer 562 aligns vertically over the sealed input surface 574 with a deposited carbon patch capacitive sensing pads 591 of the keyboard sensing hardware structure 584 formed under the sealed input surface 574 in embodiments herein.

In an embodiment, herein, the deposited carbon patches of the capacitive pads layer 580 may be formed on a top surface of a first layer of multi-layer FPC board 579 formed below the sealed input surface 574. In an embodiment, the LEDs 594 may be micro-LEDs or mini-LEDs of the LED layer 578 may also be formed on the top surface of the first layer of multi-layer FPC board 579 thereby forming a co-located layer within the keyboard sensing hardware structure 584 where the LEDs 594 are coplanar to the deposited carbon patches of the capacitive pads layer 580 and keeping the keyboard sensing hardware structure thin. The location of the deposited carbon patches of the capacitive pads layer 580 directly below the sealed input surface 574 allows for the deposited carbon patches to be located very close to the removeable tactile input layer 562 and the user's fingers and hands. This results in a high press/no-press differentiation detection at the deposited carbon patches. The high differentiation in detection of the user's fingers and hands results in a higher SNR that allows a capacitive sensor microprocessor 586 executing machine readable code instructions of a capacitive sensor driver 588 to operate at a relatively low sensitivity setting. Further, the location of the deposited carbon patches close to the user's fingers and hands also reduces the interference and increases capacitive field reach above the sealed input surface 574 that may be detected at the deposited carbon patches capacitive sensing pads 591. Still further, this arrangement of the deposited carbon patches of the capacitive pads layer 580 close to the removeable tactile input layer 562 decreases the thickness of the split keyboard stack structure 552 resulting in a thinner base chassis of the information handling system.

As described in embodiments herein, each of the plurality of capacitive sensor pads 591 in the capacitive pads layer 580 may be operatively coupled to a capacitive sensor microprocessor 586 executing machine readable code instructions of a capacitive sensor driver 588. In an embodiment, each of the deposited carbon patches that form the plurality of capacitive sensor pads 591 of the capacitive pads layer 580 may be operatively coupled to the capacitive sensor microprocessor 586 via carbon, silver, or silver carbon traces formed on the top surface of the first layer of a multi-layer FPC board 579. It is also appreciated that other types of traces may be formed to operatively couple the carbon capacitive sensor pads 591 to the capacitive sensor microprocessor 586 executing machine readable code instructions of the capacitive sensor driver 588 such as silver trances, copper traces, and/or ITO that allow each of the deposited carbon patches capacitive sensor pads 591 to detect capacitive change signals to the capacitive sensor microprocessor 586 for determination of a particular keypress actuation of a keyboard key, determination of a user's touch input, and/or determination of a user's touchless gesture input at or near the keyboard keys or other I/O surfaces the removable tactile input layer 562 for the split-keyboard stack structure 552.

Machine readable code instruction of the capacitive sensor driver 588 may be executed by the capacitive sensor microprocessor 586 to detect and determine which of the plurality of keys on the removable tactile input layer 562 have been pressed and detected at each of the plurality of capacitive sensor pads 591 based on location and a detected level of capacitance change. The capacitive sensor microprocessor 586 executing the machine readable code instructions of the capacitive sensor driver 588 may relay these inputs to the hardware processor 502 for processing of keystrokes as input to the information handling system in embodiments herein.

In some embodiments, the sealed input surface 574 may include an active shielding layer 582 to shield the plurality of capacitive sensor pads 591 (e.g., the deposited carbon patches) within the capacitive pads layer 580 from parasitic capacitive grounding to the grounding layer 584 serving as an EMI shield for the keyboard chassis and grounding for the split-keyboard stack structure. FIG. 5 shows a plurality of active shielding pads 583 placed below each of the capacitive sensor pads 591 to shield each of the capacitive sensor pads 591 from grounding by the grounding layer 584. In an embodiment, the active shielding pads 583 may be formed on a second layer of multi-layer FPC board 577 which may be an opposite layer side of the multi-layer FPC board 577 from the first layer of the multi-layer FPC board 579 in some embodiments. In an embodiment, the active shielding layer 582 may be operatively coupled to a voltage source as controlled by the capacitive sensor microprocessor 586 such that the voltage level of the active shielding in the active shielding layer 582 is held at about that of the capacitive sensing pads 591 of the capacitive pads layer 580 to that capacitive fields of the capacitive sensor pads 591 must go around the active shielding pads 583 to ground thereby preventing parasitic capacitive grounding of the capacitive sensing pads by the grounding layer 584.

The grounding layer 584 is used for split-keyboard stack structure 552 grounding as well EMI and noise shielding of hardware components such as the information handling system hardware mainboard 593 within the information handling system hardware cavity 533 of the keyboard chassis in embodiments herein. Due to the thin profile of the multi-layer FPC board for the keyboard sensing hardware structure formed under the sealed input surface 574, the grounding layer 584 is potentially close to the capacitive pads layer 580 such that parasitically grounding capacitance of those capacitive sensing pads 591 may disrupt the operation of the plurality of capacitive sensor pads 591 (e.g., carbon pads) within the capacitive pads layer 580 from effectively detecting other capacitive changes due to user inputs. The active shielding layer 582 may be driven using the same voltage as the plurality of capacitive sensor pads 591 within the capacitive pads layer 580 in some embodiments. This reduces parasitic capacitance between the plurality of capacitive sensor pads of the capacitive pads layer 580 and the grounding layer 584 placed below the active shielding layer 582. Thus, the active shielding layer 582 further improves SNR and extends capacitive sensing range of the plurality of capacitive sensor pads 591 of the capacitive pads layer 580 in the keyboard sensing hardware structure formed under the sealed input surface 574.

As described, in some embodiments, the sealed input surface 574 also includes the grounding layer 584. In an embodiment, the grounding layer 584 may be formed on a bottom surface of the second layer of multi-layer FPC board 577. In an alternative embodiment, the grounding layer 584 may be a distinct layer from the multi-layer FPC board of the keyboard sensing hardware structure. It is appreciated that other hardware components of the information handling system may be placed below the grounding layer 584 that may include an information handling system hardware mainboard 593 that may house the hardware processor, other processing devices, the PMU, the wireless interface adapter, the radio, the RF front end, and the antenna among other hardware components. The grounding layer 584 may prevent external EMI interference to hardware components in the chassis, such as the base chassis, of the information handling system or prevent EMI interference from those hardware components externally. In an embodiment, the grounding layer 584 may also provide a stable electrical reference for the active circuitry of the keyboard sensing hardware structure 584 formed under the sealed input surface 574 and help to define signal baseline grounding source at the plurality of capacitive sensor pads 591 by the capacitive sensor microprocessor 586. Thus, the grounding layer 584 may prevent any EMI and noise from those hardware components also from affecting the operation of the capacitive pads layer 580 as described herein.

In an embodiment, the capacitive sensor microprocessor 570 may execute machine readable code instructions of a dynamic key mapping engine 590. The dynamic key mapping engine 590 may, upon switching types of removeable tactile input layers 562 such that the key layout is different, provide for operation of the newly installed removable tactile input layer 562 with the keyboard sensing hardware structure 584 formed under the sealed input surface 574. For example, a user may switch from a QWERTY-type keyboard layout of a first removable tactile input layer 562 to other types of keyboard key layouts that include, for example, Dvorak simplified keyboard, a Colemak keyboard, AZERTY keyboard, a QWERTZ keyboard, a JIS keyboard, Hangul keyboard, and other language-specific layouts, region-specific layouts, task-specific layouts, and specialized keyboard layouts. Each of these different layouts of the various removable tactile input layers 562 may be detected using various detection devices including dedicated carbon patches, magnets, optical markers, NFC tags, RFID tags and the like that are placed on the underside of the removable tactile input layer 562 and detectable by sensors placed below the sealed input surface 574. By detecting the detection devices, the capacitive sensor microprocessor 586, executing the dynamic key mapping engine 590, may know the layout of the keyboard keys of the installed removable tactile input layer 562 and assign each of the plurality of capacitive sensors in the capacitive pads layer 580 the appropriate input characteristics based on the detected type of keyboard layout on the installed removable tactile input layer 562.

Figure 6:
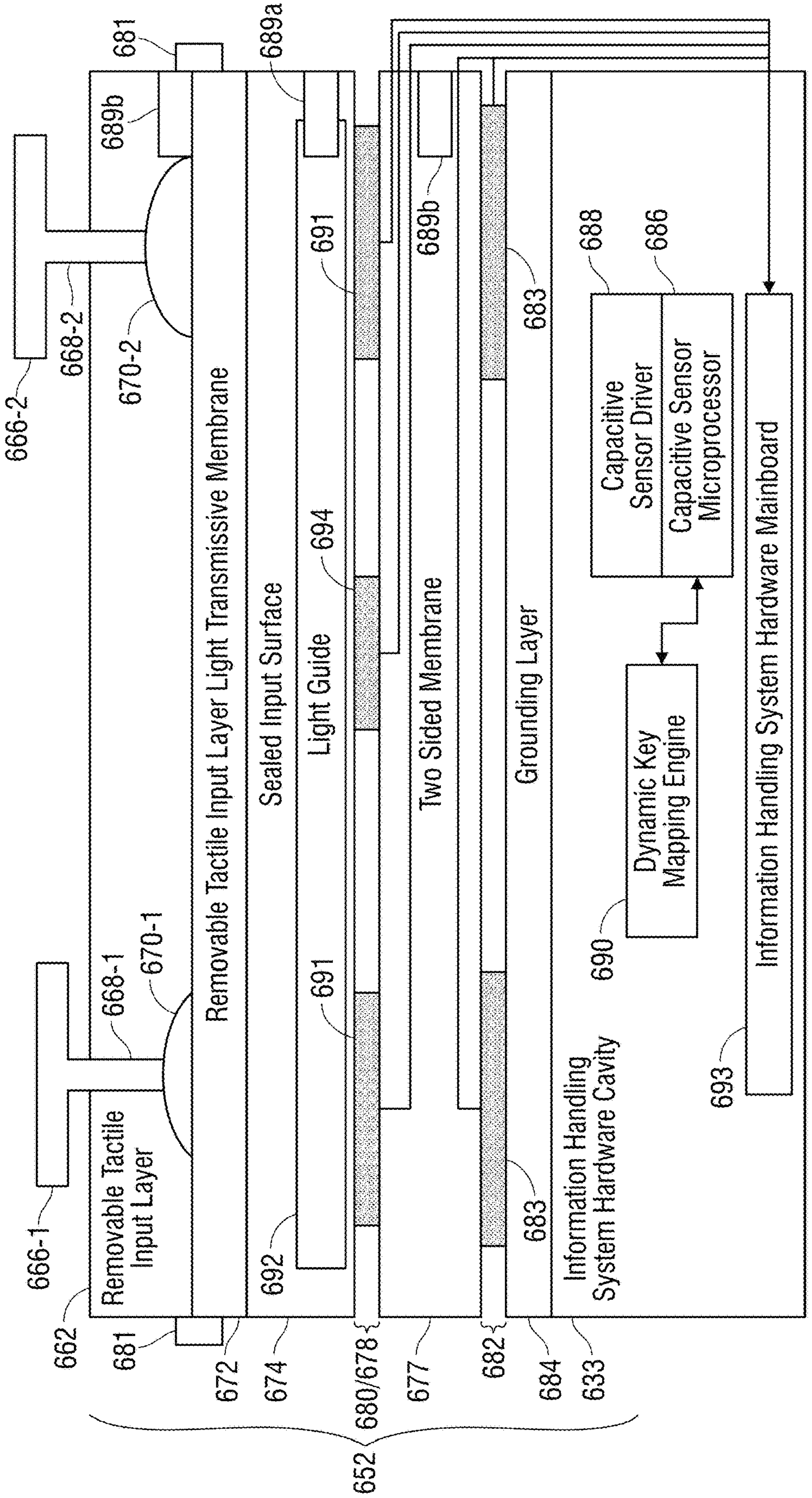
FIG. 6 is a graphic diagram illustrating a split-keyboard stack structure that includes a removable tactile input layer, a separate sealed input surface, and a keyboard sensing hardware structure on a thin two-sided substrate membrane to receive keyboard, touch, and gesture input from a user contactlessly at capacitive sensor pads and having lighting formed under the sealed input surface according to an embodiment of the present disclosure.

FIG. 6 is a graphic diagram illustrating a split-keyboard stack structure that includes a removable tactile input layer and a separate sealed input surface with a keyboard sensing hardware structure thereunder formed of a thin two-sided substrate membrane, such as a polyethylene terephthalate (PET) or other thermoplastic polymer membrane, to capacitively receive user input according to an embodiment of the present disclosure. Similar to FIG. 5, FIG. 6 shows that the split-keyboard stack structure that includes the keyboard sensing hardware structure formed of a thin two-sided substrate membrane 677, such as a PET membrane that may include a number of layers including a capacitive pads layer 680 and LED layer 678, an active shielding layer 682, and an integrated or separate grounding layer 684 to detect capacitive changes from user inputs above a sealed input surface 674 of a keyboard chassis. One or more types of removable tactile input layer 662 may be installed above sealed input surface 674 of the keyboard chassis and form the interface through which the user may provide user keypress input, user touch input or above which a user may provide touchless gesture input to the information handling system.

The removeable tactile input layer 662 may be that layer that a user interacts with to provide various types of usage input to the information handling system. This removeable tactile input layer 662 may include only mechanical elements such as mechanical keyboard keys that provide tactile response to the user when the mechanical keyboard keys are pressed. In a specific example, the removeable tactile input layer 662 may include a mechanical keyboard keys that each include a keyboard keycap 666-1, 666-2, operatively coupled to a keyboard key rubber dome 670-1, 670-2 via a keyboard key post 668-1, 668-2. In this example embodiment, instead of the keyboard key rubber dome 670-1, 670-2 and keyboard key post 668-1, 668-2 interfacing with a switch on a PCB, the keyboard key rubber dome 670-1, 670-2 and keyboard key post 668-1, 668-2 may be used to merely provide tactile feedback to the user. In this example embodiment, the removeable tactile input layer 662 may also include scissor or butterfly arms that also provide tactile feedback to the user while facilitating the recoil of the keyboard keys upwards. Thus, in the removeable tactile input layer 662 provides a tactile feel to the user such that the user feel actuation of the keyboard keys.

However, the removeable tactile input layer 662 does not include any electrical elements that are used to receive electrical signals as the user presses the keys. Therefore, in the embodiments herein, the removeable tactile input layer 662 does not include a PCB layer, a flexible PCB layer, or other electrical components that other keyboards may use to detect the press of a key by the user. Instead, in the embodiments herein, the split keyboard stack structure 652 includes a separate layer or layers that can detect user input. Therefore, the electrical components of the split keyboard stack structure 652 cannot be damaged if liquid or other contaminants are introduced into the removeable tactile input layer 662. In an example embodiment, each mechanical keyboard key may be used to rely on the presence of the user's finger to cause capacitive changes to be detected by one or more of the plurality of capacitive sensor pads 691 formed under the sealed input surface 674 as described herein. The detected change in capacitance as detected by the plurality of capacitive sensor pads 691, however, may vary depending on the size and moisture level, for example, of the user's finger.

In an embodiment, the removeable tactile input layer 662 may further include a removable tactile input layer light transmissive membrane 672. The removable tactile input layer light transmissive membrane 672 may be adjacent to a removable tactile input layer support frame or structure and be formed of a surface material that allows for light to pass through openings in the removable tactile input layer support frame and up and into the removeable tactile input layer 662. In an example embodiment, the removable tactile input layer light transmissive membrane 672 may be made of a plastic that is transparent or translucent. In an embodiment, the removable tactile input layer light transmissive membrane 672 may be made of a translucent material that scatters or diffuses a light emitted from one or more LEDs 694 of a LED layer 678 formed as part of the thin two-sided substrate membrane 677 for the keyboard sensing hardware structure mounted below the sealed input surface 674. This may create a lighted backlight or user interaction illumination for the split keyboard stack structure 652 despite the split-keyboard structure described herein.

Similar to FIG. 5, FIG. 6 shows the removeable tactile input layer 662 is operatively coupled to the sealed input surface 674. This may be accomplished using reciprocal latching or interference fit mechanisms 681 between the removable tactile input layer 662 or a support frame thereof and the sealed input surface 674 or any recessed housing well of a c-cover in which the sealed input surface 674 is formed. The removeable tactile input layer 662 may be coupled to the sealed input surface 674 using latching or interference fit mechanisms 681 or other coupling device that allows user to easily couple or decouple the removeable tactile input layer 662 from the sealed input surface 674. These reciprocal latching or interference fit mechanisms 681 allow a user to quickly decouple the removeable tactile input layer 662 from the sealed input surface 674 in order to repair the removeable tactile input layer 662 or replace the removeable tactile input layer 662 as described herein. In another example embodiment, the removeable tactile input layer 662 or its support frame includes a second magnet 689*b* that aligns with a first magnet 689*a* disposed in the sealed input surface 674 or in a recessed housing well. Because the first magnet 689*a* is aligned with the second magnet 689*b*, as the removeable tactile input layer 662 is placed near the sealed input surface 674, the first magnet 689*a* and the second magnet 689*b* are attracted together and the removeable tactile input layer 662 is operatively coupled to the sealed input surface 674.

As described herein, a separate half of the split keyboard stack structure 652 onto which the removable tactile input layer 662 is removably installed includes the sealed input surface 674 that includes a light guide layer 692. In an embodiment, the light guide layer 692 may be formed into or part of the sealed input surface 674 that is placed within a based or floor of the recessed housing well that is formed within the c-cover of the base chassis of the information handling system and secured to the c-cover and form a sealed top surface or housing cover for the keyboard or base chassis of the information handling system. This light guide layer 692 may serve as, at least, one or more light transmission structures integrated into a portion of the sealed input surface 674 or the sealed input surface 674 may itself be made of light transmissive material through which light emitted from the LEDs 694 in the LED layer 678 can be transmitted up and into the removeable tactile input layer 662 as described herein.

In an example embodiment, the keyboard sensing hardware structure formed on the thin two-sided substrate membrane 677 formed under the sealed input surface 674 may include a capacitive pads layer 680. The capacitive pads layer 680 includes a plurality of capacitive sensor pads that may correspond to each or a plurality of the keyboard keys in the removable tactile input layer 662 to detect capacitive changes due to actuation of those keyboard keys of the removable tactile input layer 662 above the sealed input surface 674 of a base chassis of the information handling system. Further, the capacitive pads layer 680 includes a plurality of capacitive sensor pads to detect capacitive changes due to touch input by a user's fingers one keys or I/O structures on the removable tactile input layer in an embodiment. In yet another embodiment, the capacitive pads layer 680 may include the plurality of capacitive sensor pads that may detect capacitive changes due to sensing proximate location of the user's body part, including fingers or hand for a touchless gesture, above those keyboard keys of the removable tactile input layer 662 and above the sealed input surface 674 of the base chassis of the information handling system.

In an embodiment, these capacitive sensor pads 691 may be made of deposited carbon pads which may be delicate but are protected and sealed under the sealed input surface 674 of the base chassis of the information handling system for the keyboard sensing hardware structure formed with the thin two-sided substrate membrane 677. The deposited carbon capacitive sensing pads 691 of the capacitive pads layer 680 have a benefit of very low cost and simple manufacturing via deposition or masked spraying to form these deposited carbon capacitive sensing pads 691. In an embodiment, these capacitive sensing pads 691 of deposited carbon may be configured to vary an electric field in response to changes in nearby capacitance. In an embodiment, the array of deposited carbon patches for the capacitive sensing pads 691 in the capacitive pads layer 680 may be arranged such that each keyboard key of the removable tactile input layer 662 aligns vertically over a deposited carbon patch capacitive sensing pad 691 of the keyboard sensing hardware structure on the thin two-sided substrate membrane 677 formed under the sealed input surface 674 in embodiments herein.

In an embodiment, the deposited carbon patches of the capacitive pads layer 680 may be formed on a top surface of the thin two-sided substrate membrane 677 formed below the sealed input surface 674. In an embodiment, the LEDs of the LED layer 678 may also be formed on the top surface of the thin two-sided substrate membrane 677 thereby forming a layer within the keyboard sensing hardware structure 684 where the LEDs are coplanar to the deposited carbon patches of the capacitive pads layer 680 enabling a thinner overall structure. The location of the deposited carbon patches of the capacitive pads layer 680 directly below the sealed input surface 674 allows for the deposited carbon patches of the capacitive sensing pads 691 to be located very close to the removeable tactile input layer 662 and the user's fingers and hands. This results in a high press/no-press differentiation detection at the deposited carbon patches forming the capacitive sensor pads 691. The high differentiation in detection of the user's fingers and hands results in a higher SNR that allows a capacitive sensor microprocessor 686 executing machine readable code instructions of a capacitive sensor driver 688 to operate at a relatively low sensitivity setting. Further, the location of the deposited carbon patches of the capacitive sensor pads 691 close to the user's fingers and hands also reduces the interference and increases capacitive field reach above the sealed input surface 674 that may be detected at the deposited carbon patches of the capacitive sensor pads 691. Still further, this arrangement of the deposited carbon patches of the capacitive pads layer 680 close to the removeable tactile input layer 662 decreases the thickness of the split keyboard stack structure 652 resulting in a thinner base chassis of the information handling system.

As described in embodiments herein, each of the plurality of capacitive sensor pads 691 in the capacitive pads layer 680 may be operatively coupled to a capacitive sensor microprocessor 686 executing machine readable code instructions of a capacitive sensor driver 688. In an embodiment, each of the deposited carbon patches that form the plurality of capacitive sensor pads 691 of the capacitive pads layer 680 may be operatively coupled to the capacitive sensor microprocessor 686 via carbon, silver, or carbon-silver traces formed on a top surface of the thin two-sided substrate membrane 677. It is also appreciated that other types of traces may be formed to operatively couple the carbon capacitive sensor pads 691 to the capacitive sensor microprocessor 686 executing machine readable code instructions of the capacitive sensor driver 688 such as silver trances, copper traces, and/or ITO that allow each of the deposited carbon patches of the capacitive sensor pads 691 to conduct detected capacitive change signals from a capacitive field to the capacitive sensor microprocessor 686 for determination of a particular keypress of a keyboard key, determination of a user's touch input, and/or determination of a user's touchless gesture input at or near the keyboard keys or other I/O surfaces the removable tactile input layer 662 for the split-keyboard stack structure 652.

The capacitive sensor microprocessor 686 executes machine readable code instructions of a capacitive sensor driver 688 to detect and determine which of the plurality of keys on the removable tactile input layer 662 have been pressed and detected at each of the plurality of capacitive sensor pads 691 based on location and a detected level of capacitance change. The capacitive sensor microprocessor 686 executing the machine readable code instructions of the capacitive sensor driver 688 may relay these inputs to the hardware processor 602 for processing of keystrokes as input to the information handling system in embodiments herein.

In some embodiments, the sealed input surface 674 may include an active shielding layer 682 to shield the capacitive fields of the plurality of capacitive sensor pads 691 (e.g., the deposited carbon patches) within the capacitive pads layer 680 from a parasitic capacitive grounding by the grounding layer 684 serving as an EMI shield for the base chassis and grounding source for the split-keyboard structure. FIG. 6 shows a plurality of active shielding pads 683 placed below each of the capacitive sensor pads 691 on the opposite side of the thin two-sided substrate membrane 677 to shield each of the capacitive sensor pads 691 from parasitic capacitive grounding by the grounding layer 684 by forcing capacitive fields of the capacitive sensor pads 691 around the active shielding pads 683. In an embodiment, the active shielding layer 682 may be operatively coupled to a voltage source as controlled by the capacitive sensor microprocessor 686 such that the voltage level of the active shielding in the active shielding layer 682 is held at about that of the capacitive sensing pads of the capacitive pads layer 680 to prevent parasitic capacitive grounding of the capacitive sensing pads 691 by the grounding layer 684. This grounding layer 684 is used for a split-keyboard structure grounding source and to provide EMI and noise shielding to or from the information handling system hardware components disposed in the information handling system hardware cavity 633 of the base chassis. Due to the thin profile of the keyboard sensing hardware structure formed under the sealed input surface 674, the grounding layer 684 is potentially close to the capacitive pads layer 680 which may disrupt the operation of the plurality of capacitive sensor pads 691 (e.g., carbon pads) by parasitically capacitively grounding capacitive fields of those capacitive sensing pads 691 and preventing the capacitive fields from detecting other capacitive changes due to user inputs that may be further away. The active shielding layer 682 may be driven using the same voltage as the plurality of capacitive sensor pads within the capacitive pads layer 680 in some embodiments. This reduces parasitic capacitance grounding between the plurality of capacitive sensor pads 691 of the capacitive pads layer 680 and the grounding layer 684 placed below the active shielding layer 682. Thus, the active shielding layer 682 further improves SNR and extends capacitive sensing range of the plurality of capacitive sensor pads 691 of the capacitive pads layer 680 in the keyboard sensing hardware structure formed under the sealed input surface 674.

As described, in some embodiments, the sealed input surface 674 may also include the grounding layer 684. It is appreciated that plural information handling system hardware components of the information handling system may be placed below the grounding layer 684 in the information handling system hardware cavity 633 of the base chassis and may include an information handling system hardware mainboard 693 that may house the hardware processor, other processing devices, the PMU, the wireless interface adapter, the radio, the RF front end, and the antenna among other hardware components. Thus, the grounding layer 684 may prevent any EMI and noise from those hardware components also from leaking or prevent external EMI and noise from affecting those information handling system hardware components as described herein.

In an embodiment, the capacitive sensor microprocessor 670 may execute machine readable code instructions of a dynamic key mapping engine 690. The dynamic key mapping engine 690 may, upon switching types of removeable tactile input layers 662 such that the key layout is different, provide for operation of the newly installed removable tactile input layer 662 with the keyboard sensing hardware structure 684 formed under the sealed input surface 674. Each of these different layouts of the various removable tactile input layers 662 may be detected using various detection devices including dedicated carbon patches, magnets, optical markers, NFC tags, RFID tags and the like that are placed on the underside of the removable tactile input layer 662 and detectable by sensors placed below the sealed input surface 674. By detecting the detection devices, the capacitive sensor microprocessor 686, executing the dynamic key mapping engine 690, may know the layout of the keyboard keys of the installed removable tactile input layer 662 and assign each of the plurality of capacitive sensors in the capacitive pads layer 680 the appropriate input characteristics based on the detected type of keyboard layout on the installed removable tactile input layer 662.

Figure 7:
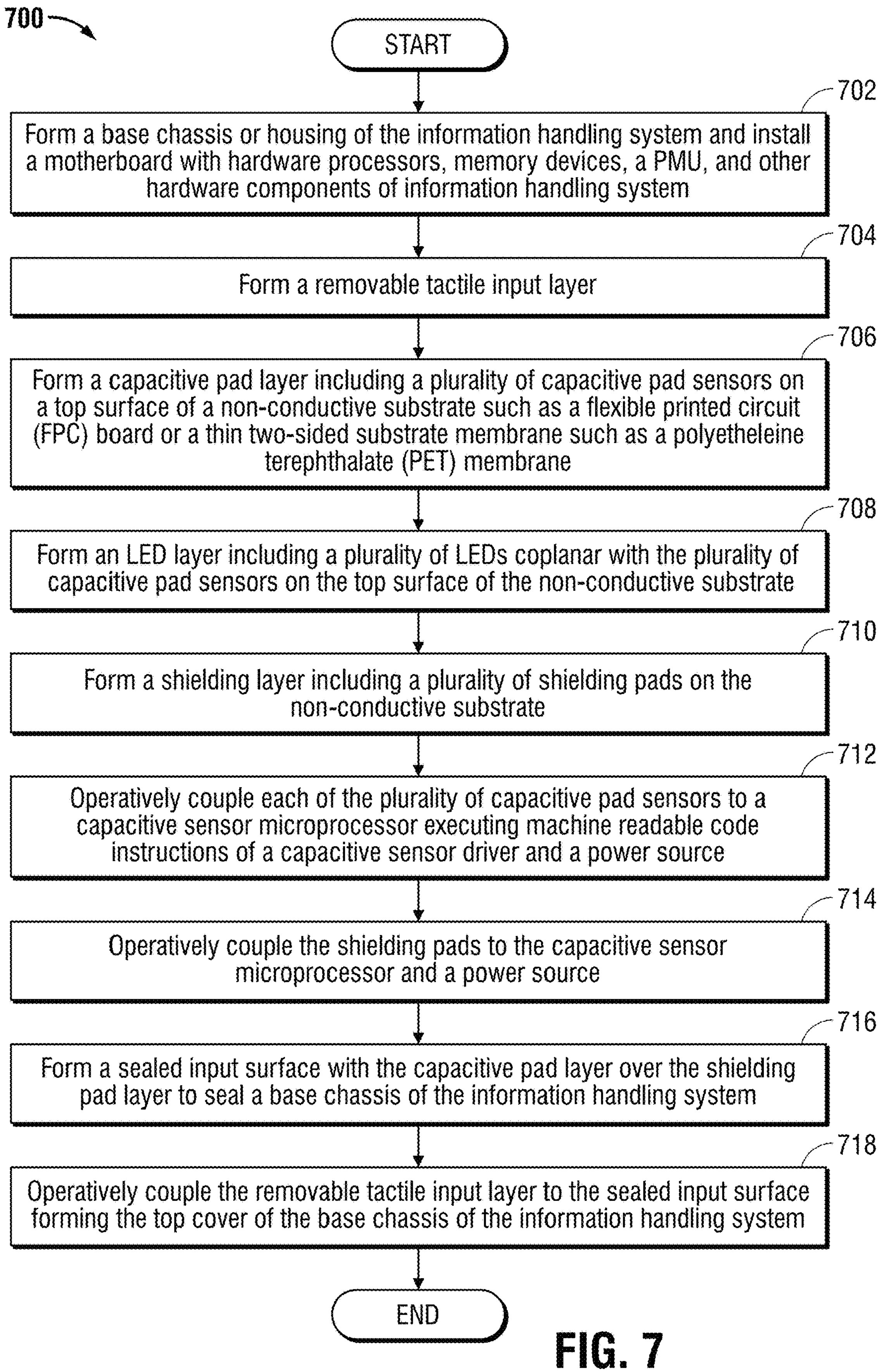
FIG. 7 is a flow diagram showing a method of manufacturing a split keyboard stack structure that includes removable tactile input layer, a separate sealed input surface, and a keyboard sensing hardware structure on an FPC layer or a thin two-sided substrate membrane to receive keyboard, touch, and gesture input from a user contactlessly at capacitive sensor pads and having lighting formed under the sealed input surface according to an embodiment of the present disclosure.

FIG. 7 is a flow diagram showing a method 700 of manufacturing a keyboard that includes a removable tactile input layer and a separate sealed input surface to receive touch and gesture input from a user according to an embodiment of the present disclosure. The method 700 may include similar process that form any of those split keyboard stack structures described in connection with, for example, embodiments of FIGS. 3A through 6 that each include a bifurcated keyboard stack that comprises replaceable removable tactile input layers and a keyboard sensing hardware structure sealed under a sealed input surface of a base chassis with a capacitive pad layer and LED layer in various configurations.

At block 702, the method 700 may include forming a base chassis or housing of the information handling system such as a tray or other structure and installing a motherboard with hardware processors, memory devices, a PMU, and other hardware components of the information handling system described herein. As described herein, the information handling system may be a laptop-type information handling system that includes a base chassis portion operatively coupled to a display chassis portion via a hinge. In an embodiment, the other hardware devices may also include fans, port systems, and a battery that may be sized to fit within this base chassis portion with the motherboard. In some embodiments, this step of including information handling system hardware components in the base chassis may occur after formation of the keyboard sensing hardware structure layers under the sealed input surface of the keyboard chassis.

At block 704, the method 700 includes forming a removable tactile input layer. As described herein, the removable tactile input layer may include a keyboard-type removeable tactile input layer, a drawing pad-type removable tactile input layer, or a control board-type removable tactile input layer. The removable tactile input layer may be that layer that a user interacts with to provide input to the information handling system. This removable tactile input layer may include only mechanical elements such as mechanical keys (key caps, key posts, popples, scissor structures and the like) according to embodiments herein, other I/O surface input interface surfaces as well as dials and sliders or control board input structures that provide tactile response to the user when the mechanical keys are pressed, dials are turned, surfaces are touched, and sliders are moved. As described herein, the removable tactile input layer does not include any electrical elements that are used to receive electrical signals or switch mechanical switches as the user presses the keys, or otherwise interfaces with these other types of input devices. Therefore, in the embodiments herein, the removable tactile input layer does not include a PCB layer, a flexible PCB layer, or other electrical components that other I/O surface input interface surfaces of the removable tactile input layers that may be used to detect user actuation. Instead, in the embodiments herein, the keyboard input layers and other I/O surface input interface surfaces of the removable tactile input layers are operatively coupled to a sealed input surface having a keyboard sensing hardware structure formed underneath to detect strokes of the keys and touch and gesture inputs on or above the removable tactile input layers. A support frame of the one or more removable tactile input layers is formed to include magnets, press fit, or interference fit edge structures, latch or fastener structures, as well as tabs, recessed housing welled tabs, notches or other structures for coupling and decoupling the removable tactile input layers with the sealed input surface of the keyboard chassis in various embodiments herein.

In an embodiment, the removeable tactile input layer may further include a removable tactile input layer light transmissive membrane. The removable tactile input layer light transmissive membrane may be any surface that allows for light to pass up and through openings in the removable tactile input layer support frame and into the removeable tactile input layer. In an example embodiment, the removable tactile input layer light transmissive membrane may be made of a plastic that is transparent or translucent. In an embodiment, the removable tactile input layer light transmissive membrane may be made of a translucent material that scatters or diffuses a light emitted from one or more LEDs of a LED layer formed below the sealed input surface. This may create a lighted backlight for the keyboard despite the split-keyboard structure described herein.

In an embodiment, the removeable tactile input layer may further include a removable lattice. The removable lattice may be a lattice structure that is formed around each of the keyboard keycaps of each keyboard keys on the keyboard. In an embodiment, the removable lattice may be made of a rigid material such as a plastic. The removable lattice may be used to secure the removeable tactile input layer into a recessed housing well formed into a c-cover of the base chassis of the laptop-type information handling system such that the removeable tactile input layer may be maintained within the recessed housing well. It is appreciated that the removable lattice may include any latching mechanism, interference fit structures, magnetic structures, or the like to secure the removeable tactile input layer into this recessed housing well.

At block 706, the method 700 further includes forming a keyboards sensing hardware structure with a capacitive pad layer that includes a plurality of capacitive sensor pads on a non-conductive substrate such as the multi-layer FPC board or the thin two-sided substrate membrane, such as a PET membrane, as described in connection with embodiments of FIGS. 5 and 6, respectively. The capacitive sensor pads may be deposited carbon formed onto the non-conductive substrate of the keyboard sensing hardware structure that is either the multi-layer FPC board or thin two-sided substrate membrane below the sealed input surface of the base chassis in embodiments herein. In an embodiment, the keyboard sensing hardware structure on the multi-layer FPC board or thin two-sided substrate membrane may be secured under a bottom surface of the sealed input surface. The multi-layer FPC board, for example, may be secured via a thin bead or layer of adhesive for example. While adhesive may be used as well for the thin two-sided substrate membrane, it is such a thin membrane that it may be physically installed or inserted under the bottom surface of the sealed input surface without adhesive with the capacitive sensor pads still disposed and held very close to the bottom of the sealed input surface of the base chassis.

The capacitive pad layer may include a plurality of capacitive sensor pads that can sense proximate location of the user's body or at least partially conductive structures that cause a capacitance change within capacitive fields of the capacitive sensor pads including fingers at or above the removable tactile input layer for partially conductive or conductive structures of the removable tactile inputs layers. In an embodiment, the plurality of capacitive sensors may include patches of deposited carbon deposited on the top surface of the keyboards sensing hardware structure as multi-layer FPC board or thin two-sided substrate membrane and configured to vary an electric field in response to changes in nearby capacitance with those deposited carbon capacitance sensor pads. These carbon-based patches may be arranged in a sensor matrix of capacitive sensor pads and may be printed, sputtered, or otherwise deposited on the keyboard sensing hardware structure that is the multi-layer FPC board or thin two-sided substrate membrane. Further, the arrangement of the capacitive sensor pads may be operatively coupled via conductive traces to one or more capacitive sensor microprocessors and a power source or a ground. These conductive traces of the keyboard sensing hardware structure may be within or deposited on the multi-layer FPC board operatively coupled under the capacitive sensor pads on the underside of the sealed input surface or may be printed, sputtered, or otherwise deposited on the thin two-sided substrate membrane forming the underside of the sealed input surface.

In an embodiment, the array of deposited carbon patches may be arranged such that each key of a keyboard-type removable tactile input layer aligns vertically with at least one deposited carbon patch. In an embodiment, these deposited carbon patches may be arranged in an array that includes columns and rows of deposited carbon patches although any variety of carbon patches for capacitive sensor pads formed on keyboard sensing hardware structure on the underside of the sealed input layer of the base chassis is contemplated.

It is appreciated that a non-conductive substrate layer of the keyboard sensing hardware structure for the split-keyboard stack structure may be one of multi-layer FPC board or thin two-sided substrate membrane as described in connection with FIGS. 5 and 6, respectively. In an embodiment, herein, the deposited carbon patches of the capacitive pads layer may be formed on a top surface of a first layer of multi-layer FPC board formed or on a top side surface of a thin two-sided substrate membrane inserted below the sealed input surface in various embodiments herein. In various embodiments, the LEDs of the LED layer may also be formed on the top surface of the first layer of multi-layer FPC board or on a second side of the thin two-sided substrate membrane thereby forming an LED layer within the keyboard sensing hardware structure where the LEDs are coplanar to the deposited carbon patches of the capacitive pads layer. The location of the deposited carbon patches of the capacitive pads layer directly below the sealed input surface allows for the deposited carbon patches to be located very close to the removeable tactile input layer and the user's fingers and hands. This results in a high press/no-press differentiation detection at the deposited carbon patches. The high differentiation in detection of the user's fingers and hands results in a higher SNR that allows a capacitive sensor microprocessor executing computer readable code instructions of a capacitive sensor driver to operate at a relatively low sensitivity setting. Further, the location of the deposited carbon patches close to the user's fingers and hands also reduces the interference and increases capacitive field reach above the sealed input surface that may be detected at the deposited carbon patches. Still further, this arrangement of the deposited carbon patches of the capacitive pads layer close to the removeable tactile input layer decreases the thickness of the keyboard resulting in a thinner base chassis of the information handling system.

At block 708, the method 700 also includes forming an LED layer including a plurality of LEDs coplanar with the plurality of capacitive sensor pads on the top surface of the non-conductive substrate as described. As described herein, the LEDs of the LED layer may be formed of micro-LED structures or mini-LED structures formed into or on the top surface of multi-layer FPC board or thin two-sided substrate membrane of the keyboard sensing hardware structure for the split keyboard stack structure of embodiments herein. Electrical traces made of, for example, silver may be deposited onto the top surface of the non-conductive substrate in order to operatively couple the LEDs to a capacitive sensor microprocessor and a power source as described herein. Because of the disparate voltage requirements for the LEDs and capacitive sensor pads, the electrical traces formed on or within the multi-layer FPC board or thin two-sided substrate membrane operatively coupling the LEDs may be different from traces from the capacitive sensor pads to the capacitive sensor microprocessor. For example, deposited or integrated traces from the capacitive sensor pads to the capacitive sensor microprocessor and a power source may be made of a different material such as deposited carbon, silver, or carbon-silver in some embodiments.

The method 700, at block 710 further includes forming a shielding layer that includes a plurality of shielding pads on or within the non-conductive substrate, such as the multi-layer FPC board or the thin two-sided substrate membrane, of the keyboard sensing hardware structure for the split keyboard stack structure. The active shielding pad or plurality of active shielding pads of the active shielding layer are formed below the capacitive pad layer in the non-conductive substrate layer that may be either a multi-layer FPC board or a thin two-sided substrate membrane in various embodiments herein. In one embodiment, the non-conductive substrate layer may include a first and second layer of multi-layer FPC board. In another embodiment, the non-conductive substrate layer may include the thin two-sided substrate membrane, such as a PET membrane, as described in connection with FIGS. 5 and 6, respectively. The shielding layer may include a plurality of shielding pads that form a shielding layer and installed vertically below each of the capacitive sensor pads on a lower or underside portion of the multi-layer FPC board or the thin two-sided substrate membrane in various embodiments. Each of the shielding pads of the shielding layer may act to shield capacitive fields of the plurality of capacitive sensors within the capacitive pad layer from parasitic capacitive grounding by a grounding layer formed below the shielding pads to ground the keyboard sensing hardware structure. In an embodiment, the active shielding pads of the active shielding layer may be driven using the same or a similar voltage as the plurality of capacitive sensor pads within the capacitive pad layer forcing the capacitive fields of the capacitive sensor pads around the active shielding pads before being grounded by the grounding layer and thus extending the range of those capacitive fields above the sealed input surface. This reduces parasitic grounding of capacitance between the plurality of capacitive sensor pads of the capacitive pad layer and the grounding layer placed below the shielding layer. These active shielding pads of the active shielding layer improves SNR and extends the sensing range of the plurality of capacitive sensors of the capacitive pad layer for detecting capacitive changes of keypress actuations, touch inputs, or gesture inputs. Indeed, in an embodiment, the active shielding pads allow a user to provide input such as gesture input even when the user is not in physical contact with any of the keys of the capacitive sensor pads of the capacitive pad layer. This is because the capacitive sense capabilities of the capacitive sensor pads is extended a further distance above the surface of the removable tactile input layer due to the inclusion of the active shielding pads of the shielding layer.

At block 712, the method 700 includes operatively coupling the plurality of capacitive sensor pads to the capacitive sensor microprocessor executing machine readable code instructions of a capacitive sensor driver. The capacitive sensor pads are operatively coupled to the capacitive sensor microprocessor via one or more conductive traces sputtered, printed or deposited on the non-conductive substrate, such as the multi-layer FPC board or thin two-sided substrate membrane in various embodiments. In other embodiments, conductive traces formed within the multi-layer FPC board (or even the thin two-sided substrate membrane) may be electrically coupled between the deposited carbon patches of the capacitive sensing pads on the non-conductive substrate and the capacitive sensor microprocessor or a power source in embodiments herein.

The capacitive sensor microprocessor executed machine readable code instructions of a capacitive sensor driver to process various user inputs provided at or above the removable tactile input layer and detected at the capacitive sensor pads. As described herein, the capacitive sensor driver may be executed by a capacitive sensor microprocessor to detect and determine which of the plurality of keys, dials, sliders, and surfaces, as well as types of user inputs are received on or above the removable tactile input layers have been detected at each of the plurality of capacitive sensors. The capacitive sensor microprocessor executing machine readable code instructions of the capacitive sensor driver may relay these inputs to the hardware processor for processing of keystrokes, touch inputs, or touchless input gestures as various user inputs to the information handling system.

In an embodiment, the capacitive sensor microprocessor may execute machine readable or machine readable program code instructions of a dynamic key mapping engine. The dynamic key mapping engine may allow a user to switch types of removable tactile input layers such that the key layout is different. For example, a user may switch from a QWERTY-type keyboard layout of a first removable tactile input layer to other types of keyboard key layouts. Each of these different layouts may be detected using various detection devices including dedicated carbon patches, magnets, optical markers, NFC tags, RFID tags and the like that are placed on the underside of the removable tactile input layer and detectable by sensors placed below the sealed input surface. By detecting the detection devices, the capacitive sensor microprocessor, executing the dynamic key mapping engine, may know the layout of the keys of the attached removable tactile input layer and assign each of the plurality of capacitive sensors in the capacitive pad layer the appropriate input characteristics based on the detected type of keyboard layout on the installed removable tactile input layer.

At block 714, the method 700 also includes operatively coupling the shielding pads to the capacitive sensor microprocessor. As described above, the shielding pads are operatively coupled to the capacitive sensor microprocessor via conductive traces in the non-conductive substrate, such as the multi-layer FPC board or the thin two-sided substrate membrane, of various embodiments of the keyboard sensing hardware structure. The capacitive sensor microprocessor may be formed on a printed circuit board (PCB) in the information handling system hardware cavity of the base chassis of the information handling system in an embodiment and the shielding pads are formed on the non-conductive substrate, such as the multi-layer FPC board or thin two-sided substrate membrane, and electrically coupled to the capacitive sensor microprocessor and a power source or ground.

The capacitive sensor pad pads and shielding pads are driven at a voltage by the capacitive sensor microprocessor and a power source such that the capacitive sensor pads detect changes in capacitance at the removable tactile input layer in a gesture detection mode according to embodiments herein. The shielding pads are driven at a similar or same voltage to shield parasitic capacitance grounding of the capacitive sensing pads by the grounding layer formed below the shielding pads.

At block 716, the method 700 may include forming the sealed input surface having the capacitive sensing pads and any conductive traces deposited on non-conductive substrate with the shielding layer and a grounding layer underneath the bottom side of the sealed input surface of the base chassis of the information handling system. This sealed input surface may be sealed to, for example, form a top surface of a base chassis housing of the information handling system such that the sealed input surface seals the remaining portions of the base housing of the information handling system and any information handing system hardware components as well as the layers of the keyboard sensing hardware structure from contaminates and liquids. In some embodiments, the sealed input surface as the top surface of the base chassis may be formed first with the keyboard sensing hardware structure as a multi-layer FPC board or thin two-sided substrate membrane with capacitive pads layer, LED layer, active shielding layer, and grounding layer formed onto an underside of the sealed input surface.

As described herein, the sealed input surface may include an integrated light guide layer including light transmissive light guide structures or the sealed input surface may be made of a light transmissive material in other embodiments. In an embodiment, the sealed input surface may be placed or formed as a floor or bottom within a recessed housing well that is formed within a c-cover of the base chassis of the information handling system and secured to the c-cover using an adhesive or other structures such as fasteners, latches, interference fit or others, for example. This light guide layer that includes, at least, a portion of the sealed input surface or the sealed input surface made of a light transmissive material provide for light emitted from the LEDs in the LED layer to be transmitted up and into the removeable tactile input layer installed above the sealed input layer of the base chassis.

In an embodiment, the keyboard may be completed by operatively coupling the removable tactile input layer, selected from a plurality of available removable tactile input layers including various removable keyboard layouts, a removable control board input layer, or a removable drawing surface input layer to the sealed input surface forming the top cover of the base chassis of the information handling system at block 718. In an embodiment, the removable tactile input layer may be operatively coupled to the sealed input surface using press fit or interference fit structures, a latching mechanism, a fastener, a coupling device such as a magnetic coupling device or an adhesive layer. This adhesive layer may include any type of glue, tape, or other adhesive that may, at least temporarily, adhere the bottom surface of the removable tactile input layer to a top surface of the sealed input surface that includes a capacitive pad layer as a top layer. In an alternative embodiment, the removeable tactile input layer may be coupled to the sealed input surface using reciprocal press fit or interference fit structures, fasteners, a latching mechanisms, or sets of magnets on the removable tactile input layer and the sealed input surface respectively as described herein. At this point the method 700 may end with the keyboard being formed in, for example, a base portion of a laptop-type information handling system.

The blocks of the flow diagrams of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system having a keyboard with a split keyboard structure comprising:

a hardware processor, a data storage device, and a power management unit (PMU) to provide power to the hardware processor and data storage device;

the split keyboard structure having a first removable tactile input layer to receive user input from a user, a sealed input layer forming a top surface of a keyboard chassis of the information handling system, and a keyboard sensing hardware structure formed on a multi-layer flexible printed circuit (FPC) board or on a thin two-sided substrate membrane underneath a bottom surface of the sealed input surface to detect capacitive changes of user inputs on or above the first removable tactile input layer;

the keyboard sensing hardware structure includes:

a plurality of capacitive sensor pads in a capacitive pads layer;

a plurality of active shielding pads in an active shielding layer;

a light-emitting diode (LED) layer comprising a plurality of LEDs formed coplanar with the capacitive sensor pads of the capacitive pads layer;

a light guide layer integrated into the sealed input layer of the keyboard chassis to transmit light emitted from the plurality of LEDs through the sealed input surface; and a capacitive sensor microprocessor executing machine readable code instructions of a capacitive sensor driver detect the capacitive changes in capacitive fields of the capacitive sensor pads from the user inputs on or above the first removable tactile input layer, wherein the first removable tactile input layer is removable from the sealed input surface of the keyboard chassis and replaceable with a second removable tactile input layer via reciprocal latching, interference fit, or magnetic operative coupling structures.

2. The information handling system of claim 1 further comprising:

the keyboard sensing hardware structure formed on the multi-layer FPC board that electrically couples the capacitive sensor microprocessor to the plurality of capacitive sensor pads and the plurality of LEDs formed on a first layer of the multi-layer FPC board and the plurality of active shielding pads are formed on a second layer of the multi-layer FPC board.

3. The information handling system of claim 1 further comprising:

the keyboard sensing hardware structure formed on the thin two-sided substrate membrane that is a polyethylene terephthalate (PET) membrane with conductive traces printed or deposited on a top surface of the thin two-sided substrate membrane to electrically couple the capacitive sensor microprocessor to the plurality of capacitive sensor pads formed on the top surface of the thin two-sided substrate membrane.

4. The information handling system of claim 1 further comprising:

the keyboard sensing hardware structure formed on the thin two-sided substrate membrane with conductive traces printed or deposited on a top surface of the thin two-sided substrate membrane to electrically couple the capacitive sensor microprocessor and a power source to the plurality of capacitive sensor pads and the plurality of LEDs that are micro-LEDs formed on the top surface of the thin two-sided substrate membrane.

5. The information handling system of claim 1 further comprising:

the keyboard sensing hardware structure formed on the thin two-sided substrate membrane with conductive traces printed or deposited on a top surface of the thin two-sided substrate membrane to electrically couple the capacitive sensor microprocessor to the plurality of capacitive sensor pads formed on the top surface of the thin two-sided substrate membrane; and conductive traces printed or deposited on a bottom surface of the thin two-sided substrate membrane to electrically couple the capacitive sensor microprocessor to the plurality of active shielding pads formed on a bottom side of the thin two-sided substrate membrane.

6. The information handling system of claim 1, further comprising:

a grounding layer formed under the active shielding layer to provide a grounding source for the capacitive sensor pads and to form an electromagnetic interference (EMI) shield for the hardware processor, data storage device and other information handling system hardware components within the keyboard chassis.

7. The information handling system of claim 1 further comprising:

the sealed input surface of the keyboard chassis is formed into a recessed housing well within a c-cover surface over the sealed input surface of the keyboard chassis having a first reciprocal latching, interference fit, or magnetic operative coupling structure, wherein a support frame of the first removable tactile input layer has a second reciprocal latching, interference fit, or magnetic operative coupling structure for operative coupling the first removable tactile input layer within the recessed housing well and over the sealed input surface of the keyboard chassis.

8. The information handling system of claim 1, wherein each of the plurality of capacitive sensor pads are operatively coupled to the capacitive sensor microprocessor via carbon ink traces formed on the multi-layer FPC board or on the thin two-sided substrate membrane and the plurality of LEDs are operatively coupled to the capacitive sensor microprocessor via metallic traces formed on the multi-layer flexible printed circuit (FPC) board or on the thin two-sided substrate membrane.

9. The information handling system of claim 1, wherein the plurality of capacitive sensor pads are carbon pads sputter coated onto a top surface of the multi-layer flexible printed circuit (FPC) board or the thin two-sided substrate membrane and disposed vertically below a plurality of keyboard keys of the first removable tactile input layer.

10. An information handling system having a keyboard with a split keyboard structure comprising:

a hardware processor, a data storage device, and a power management unit (PMU) to provide power to the hardware processor and data storage device;

the split keyboard structure having a first removable tactile input layer to receive user input from a user, a sealed input layer forming a top surface of a keyboard chassis of the information handling system, and a keyboard sensing hardware structure formed on a multi-layer flexible printed circuit (FPC) board or on a thin two-sided substrate membrane underneath a bottom surface of the sealed input surface to detect capacitive changes of user inputs on or above the first removable tactile input layer;

the keyboard sensing hardware structure includes:

a plurality of capacitive sensor pads in a capacitive pads layer, wherein the plurality of capacitive sensor pads are carbon pads sputter coated onto a top surface of the multi-layer flexible printed circuit (FPC) board or the thin two-sided substrate membrane and disposed vertically below a plurality of keyboard keys of the first removable tactile input layer;

a plurality of active shielding pads in an active shielding layer;

a light-emitting diode (LED) layer comprising a plurality of LEDs formed coplanar with the capacitive sensor pads of the capacitive pads layer;

a grounding layer formed under the active shielding layer to provide a grounding source for the capacitive sensor pads;

the sealed input layer of the keyboard chassis to transmit light emitted from the plurality of LEDs through the sealed input surface and up into the first removable tactile input layer; and a capacitive sensor microprocessor executing machine readable code instructions of a capacitive sensor driver detect the capacitive changes in capacitive fields of the capacitive sensor pads from the user inputs on or above the first removable tactile input layer, wherein the first removable tactile input layer is removable from the sealed input surface of the keyboard chassis and replaceable with a second removable tactile input layer via reciprocal latching, interference fit, or magnetic operative coupling structures.

11. The information handling system of claim 10 further comprising:

the keyboard sensing hardware structure formed on the multi-layer FPC board that electrically couples the capacitive sensor microprocessor to the plurality of capacitive sensor pads and the plurality of LEDs formed on a first layer of the multi-layer FPC board and the plurality of active shielding pads are formed on a second layer of the multi-layer FPC board.

12. The information handling system of claim 10 further comprising:

the keyboard sensing hardware structure formed on the thin two-sided substrate membrane that is a polyethylene terephthalate (PET) membrane with conductive traces printed or deposited on a top surface of the thin two-sided substrate membrane to electrically couple the capacitive sensor microprocessor to the plurality of capacitive sensor pads formed on the top surface of the thin two-sided substrate membrane.

13. The information handling system of claim 10 further comprising:

the keyboard sensing hardware structure formed on the thin two-sided substrate membrane with conductive traces printed or deposited on a top surface of the thin two-sided substrate membrane to electrically couple the capacitive sensor microprocessor and a power source to the plurality of capacitive sensor pads and the plurality of LEDs that are micro-LEDs formed on the top surface of the thin two-sided substrate membrane.

14. The information handling system of claim 10 further comprising:

the keyboard sensing hardware structure formed on the thin two-sided substrate membrane with conductive traces printed or deposited on a top surface of the thin two-sided substrate membrane to electrically couple the capacitive sensor microprocessor to the plurality of capacitive sensor pads formed on the top surface of the thin two-sided substrate membrane; and conductive traces printed or deposited on a bottom surface of the thin two-sided substrate membrane to electrically couple the capacitive sensor microprocessor to the plurality of active shielding pads formed on a bottom side of the thin two-sided substrate membrane.

15. The information handling system of claim 10 further comprising:

the sealed input surface of the keyboard chassis is formed into a recessed housing well within a c-cover surface over the sealed input surface of the keyboard chassis having a first reciprocal latching, interference fit, or magnetic operative coupling structure, wherein a support frame of the first removable tactile input layer has a second reciprocal latching, interference fit, or magnetic operative coupling structure for operative coupling the first removable tactile input layer within the recessed housing well and over the sealed input surface of the keyboard chassis.

16. An information handling system having a keyboard with a split keyboard structure comprising:

a hardware processor, a data storage device, and a power management unit (PMU) to provide power to the hardware processor and data storage device;

the split keyboard structure having a first removable tactile input layer to receive user input from a user, a sealed input layer forming a top surface of a keyboard chassis of the information handling system, and a keyboard sensing hardware structure formed on a multi-layer flexible printed circuit (FPC) board or on a thin two-sided substrate membrane underneath a bottom surface of the sealed input surface to detect capacitive changes of user inputs on or above the first removable tactile input layer;

the keyboard sensing hardware structure includes:

a plurality of capacitive sensor pads in a capacitive pads layer;

a plurality of active shielding pads in an active shielding layer;

a light-emitting diode (LED) layer comprising a plurality of LEDs formed coplanar with the capacitive sensor pads of the capacitive pads layer;

a grounding layer formed under the active shielding layer to provide a grounding source for the capacitive sensor pads;

the sealed input layer is formed into a recessed housing well within a c-cover surface over the sealed input surface of the keyboard chassis having a first reciprocal latching, interference fit, or magnetic operative coupling structure and transmits light emitted from the plurality of LEDs through the sealed input surface of the keyboard chassis;

a support frame of the first removable tactile input layer including a second reciprocal latching, interference fit, or magnetic operative coupling structure for operative coupling the first removable tactile input layer within the recessed housing well and over the sealed input surface of the keyboard chassis wherein the first removable tactile input layer is removable from the sealed input surface via the second reciprocal latching, interference fit, or magnetic operative coupling structure and replaceable with a second removable tactile input layer; and a capacitive sensor microprocessor executing machine readable code instructions of a capacitive sensor driver detect the capacitive changes in capacitive fields of the capacitive sensor pads from the user inputs on or above the first removable tactile input layer.

17. The information handling system of claim 16 further comprising:

the keyboard sensing hardware structure formed on the multi-layer FPC board that electrically couples the capacitive sensor microprocessor to the plurality of capacitive sensor pads and the plurality of LEDs formed on a first layer of the multi-layer FPC board and the plurality of active shielding pads are formed on a second layer of the multi-layer FPC board.

18. The information handling system of claim 16 further comprising:

the keyboard sensing hardware structure formed on the thin two-sided substrate membrane that is a polyethylene terephthalate (PET) membrane with conductive traces printed or deposited on a top surface of the thin two-sided substrate membrane to electrically couple the capacitive sensor microprocessor to the plurality of capacitive sensor pads formed on the top surface of the thin two-sided substrate membrane.

19. The information handling system of claim 16 further comprising:

the keyboard sensing hardware structure formed on the thin two-sided substrate membrane with conductive traces printed or deposited on a top surface of the thin two-sided substrate membrane to electrically couple the capacitive sensor microprocessor and a power source to the plurality of capacitive sensor pads and the plurality of LEDs that are micro-LEDs formed on the top surface of the thin two-sided substrate membrane.

20. The information handling system of claim 16 further comprising:

the keyboard sensing hardware structure formed on the thin two-sided substrate membrane with conductive traces printed or deposited on a top surface of the thin two-sided substrate membrane to electrically couple the capacitive sensor microprocessor to the plurality of capacitive sensor pads formed on the top surface of the thin two-sided substrate membrane; and conductive traces printed or deposited on a bottom surface of the thin two-sided substrate membrane to electrically couple the capacitive sensor microprocessor to the plurality of active shielding pads formed on a bottom side of the thin two-sided substrate membrane.

* * * * *